(12) United States Patent
Sindhu et al.

(10) Patent No.: US 12,119,950 B2
(45) Date of Patent: *Oct. 15, 2024

(54) EARLY ACKNOWLEDGMENT FOR WRITE OPERATIONS

(71) Applicant: Microsoft Technology Licensing, LLC, Redmond, WA (US)

(72) Inventors: Pradeep Sindhu, Los Altos Hills, CA (US); Jaspal Kohli, Sunnyvale, CA (US); Philip A. Thomas, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

This patent is subject to a terminal disclaimer.

(21) Appl. No.: 17/333,401

(22) Filed: May 28, 2021

(65) Prior Publication Data

US 2021/0288830 A1 Sep. 16, 2021

Related U.S. Application Data

(63) Continuation of application No. 16/434,898, filed on Jun. 7, 2019, now Pat. No. 11,025,445.

(Continued)

(51) Int. Cl.
*H04L 12/18* (2006.01)
*G06F 11/16* (2006.01)
(Continued)

(52) U.S. Cl.
CPC ...... *H04L 12/1868* (2013.01); *G06F 11/1625* (2013.01); *G06F 11/2056* (2013.01); *H04L 12/66* (2013.01)

(58) Field of Classification Search
CPC .. H04L 12/1868; H04L 12/66; G06F 11/1625; G06F 11/2056
See application file for complete search history.

(56) References Cited

U.S. PATENT DOCUMENTS 6,359,882 B1 * 3/2002 Robles ................... H04L 47/10
370/389
7,631,021 B2 12/2009 Sarma et al.
(Continued)

OTHER PUBLICATIONS

International Search Report and Written Opinion of International Application No. PCT/US2019/036071, mailed Aug. 29, 2019, 13 pp.

(Continued)

*Primary Examiner* — Lance Leonard Barry
*Assistant Examiner* — Kidest Mendaye
(74) *Attorney, Agent, or Firm* — Alleman Hall & Tuttle LLP

(57) ABSTRACT

This disclosure describes techniques for providing early acknowledgments to a source device performing a data write operation within a data center or across a geographically-distributed data center. In one example, this disclosure describes a method that includes receiving, by a gateway device and from a source device within a local data center, data to be stored at a remote destination device that is located within a remote data center; storing, by the gateway device, the data to high-speed memory included within the gateway device; transmitting, by the gateway device, the data over a connection to the remote data center; after transmitting the data and before the data is stored at the remote destination device, outputting, by the gateway device to the source device, a local acknowledgment, wherein the local acknowledgment indicates to the source device that the data can be assumed to have been stored at the remote destination device.

20 Claims, 8 Drawing Sheets

Related U.S. Application Data

(60) Provisional application No. 62/777,654, filed on Dec. 10, 2018, provisional application No. 62/682,687, filed on Jun. 8, 2018.

(51) Int. Cl.
  *G06F 11/20* (2006.01)
  *H04L 12/66* (2006.01)

(56) References Cited

U.S. PATENT DOCUMENTS

| | | | |
|---|---|---|---|
| 7,870,350 B1 * | 1/2011 | Yu | G06F 13/161 711/155 |
| 8,001,307 B1 * | 8/2011 | Gole | G06F 11/2079 711/158 |
| 8,462,630 B2 | 6/2013 | Samuels et al. | |
| 8,639,989 B1 * | 1/2014 | Sorenson, III | G06F 11/2071 709/224 |
| 8,843,783 B2 * | 9/2014 | Cox | G06F 11/2079 714/6.23 |
| 8,856,202 B2 * | 10/2014 | McCabe | G06F 3/0626 709/200 |
| 9,513,820 B1 * | 12/2016 | Shalev | G06F 3/0611 |
| 10,423,563 B2 | 9/2019 | Katrinis et al. | |
| 10,565,112 B2 | 2/2020 | Noureddine et al. | |
| 10,659,254 B2 | 5/2020 | Sindhu et al. | |
| 10,686,729 B2 | 6/2020 | Sindhu et al. | |
| 10,761,931 B2 | 9/2020 | Goyal et al. | |
| 10,841,245 B2 | 11/2020 | Gray et al. | |
| 11,025,445 B2 | 6/2021 | Sindhu et al. | |
| 2009/0083813 A1 | 3/2009 | Dolce et al. | |
| 2010/0235431 A1 | 9/2010 | Poluri et al. | |
| 2010/0250646 A1 | 9/2010 | Dunagan et al. | |
| 2011/0099342 A1 * | 4/2011 | Ozdemir | G06F 11/2074 711/E12.002 |
| 2015/0309877 A1 | 10/2015 | Cilfone et al. | |
| 2016/0156696 A1 * | 6/2016 | Liddicott | H04L 67/06 709/203 |
| 2016/0380650 A1 * | 12/2016 | Calder | H03M 13/2948 714/766 |
| 2017/0149900 A1 * | 5/2017 | Moriguchi | G05B 23/0221 |
| 2017/0235631 A1 | 8/2017 | Hetzler | |
| 2018/0024776 A1 | 1/2018 | Miller | |
| 2018/0167263 A1 | 6/2018 | Patel et al. | |
| 2018/0287965 A1 | 10/2018 | Sindhu et al. | |
| 2018/0293168 A1 | 10/2018 | Noureddine et al. | |
| 2019/0012278 A1 | 1/2019 | Sindhu et al. | |
| 2019/0013965 A1 | 1/2019 | Sindhu et al. | |
| 2019/0104206 A1 | 4/2019 | Goel et al. | |
| 2019/0158428 A1 | 5/2019 | Gray et al. | |
| 2019/0319871 A1 | 10/2019 | Indiresan et al. | |
| 2020/0183841 A1 | 6/2020 | Nourredine et al. | |
| 2020/0280462 A1 | 9/2020 | Sindhu et al. | |
| 2020/0314026 A1 | 10/2020 | Sindhu et al. | |
| 2020/0401483 A1 | 12/2020 | Goyal et al. | |

OTHER PUBLICATIONS

International Preliminary Report on Patentability from International Application No. PCT/US2019/036071, mailed Dec. 17, 2020, 8 pp.
Prosecution History from U.S. Appl. No. 16/434,898, dated Sep. 16, 2020 through Mar. 29, 2021, 41 pp.

* cited by examiner

EARLY ACKNOWLEDGMENT FOR WRITE OPERATIONS

CROSS REFERENCE

This application is a continuation application of and claims priority to U.S. patent application Ser. No. 16/434,898 filed on Jun. 7, 2019, which claims the benefit of U.S. Provisional Patent Application No. 62/682,687 filed on Jun. 8, 2018, and U.S. Provisional Patent Application No. 62/777,654 filed on Dec. 10, 2018. The entire content of all of these applications is hereby incorporated by reference.

TECHNICAL FIELD

The disclosure relates to computer networks and, more particularly, to update operations in the context of data centers distributed over physical distance.

BACKGROUND

In a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as compute nodes, networking and storage systems, power systems, and environmental control systems. In most data centers, clusters of storage systems and application servers are interconnected via a high-speed switch fabric provided by one or more tiers of physical network switches and routers. Data centers vary greatly in size, with some public data centers containing hundreds of thousands of servers. Further, data centers may be geographically distributed, so that the data hosted by a data center may be stored in any of a number of geographic locations, and/or distributed across multiple geographic locations.

SUMMARY

This disclosure describes techniques for providing an early acknowledgment to a source device performing a data write operation within a data center or across a geographically-distributed data center. In some examples, procedures for providing acknowledgements, as described herein, may enable write operations to be performed without requiring an end-to-end acknowledgment from the destination device(s). Techniques in accordance with one or more aspects of the prevent disclosure may enable acknowledgments to be communicated more quickly to a source device, thereby enabling the source device to perform a sequence of data operations at a higher rate than if an end-to-end acknowledgment from the destination device were required for each write operation.

As described in one or more examples, techniques may involve a gateway device within a data center providing early acknowledgments to a source device within that same data center for write operations to a destination device located at a remote data center. In such an example, the gateway device may receive data from the source device, and then output a write acknowledgment to the source device after transmitting the data outside of the data center, but before the data is actually stored at the destination device at the remote data center. The write acknowledgment may indicate to the source device that it can assume that the data has been written to a device within the remote destination data center. In some examples, the gateway device may use a stable storage device, such as a solid-state storage device, to provide resistance to power, connectivity, and/or other failures that may affect the path between the source device and the destination device.

In one example, this disclosure describes a gateway device comprising a storage system and processing circuitry having access to the storage system and configured to: receive, from a source device within a data center, data to be stored at a remote destination device not located within the data center; generate a plurality of data segments that enable the data to be reconstructed from a subset of the plurality of the data segments; transmit each of the plurality of data segments over a network to a different one of a plurality of remote data centers; and after transmitting each of the data segments and before the data is stored at the remote destination device, output, to the source device, a local acknowledgment, wherein the local acknowledgment indicates to the source device that the data can be assumed to have been stored at the remote destination device.

In another example, this disclosure describes a method comprising: receiving, by a gateway device and from a source device within a data center, data to be stored at a remote destination device not located within the data center; generating a plurality of data segments that enable the data to be reconstructed from a subset of the plurality of the data segments; transmitting, by the gateway device, each of the plurality of data segments over a network to a different one of a plurality of remote data centers; and after transmitting each of the data segments and before the data is stored at the remote destination device, outputting, by the gateway device and to the source device, a local acknowledgment, wherein the local acknowledgment indicates to the source device that the data can be assumed to have been stored at the remote destination device.

In another example, this disclosure describes a computer-readable storage medium comprising instructions that, when executed, configure processing circuitry to: receive, from a source device within a data center, data to be stored at a remote destination device not located within the data center; generate a plurality of erasure coding segments that enable the data to be reconstructed from a subset of the plurality of the erasure coding segments; transmit each of the plurality of erasure coding segments over a network to a different one of a plurality of remote data centers; and after transmitting each of the erasure coding segments and before the data is stored at the remote destination device, output, to the source device, a local acknowledgment, wherein the local acknowledgment indicates to the source device that the data can be assumed to have been stored at the remote destination device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
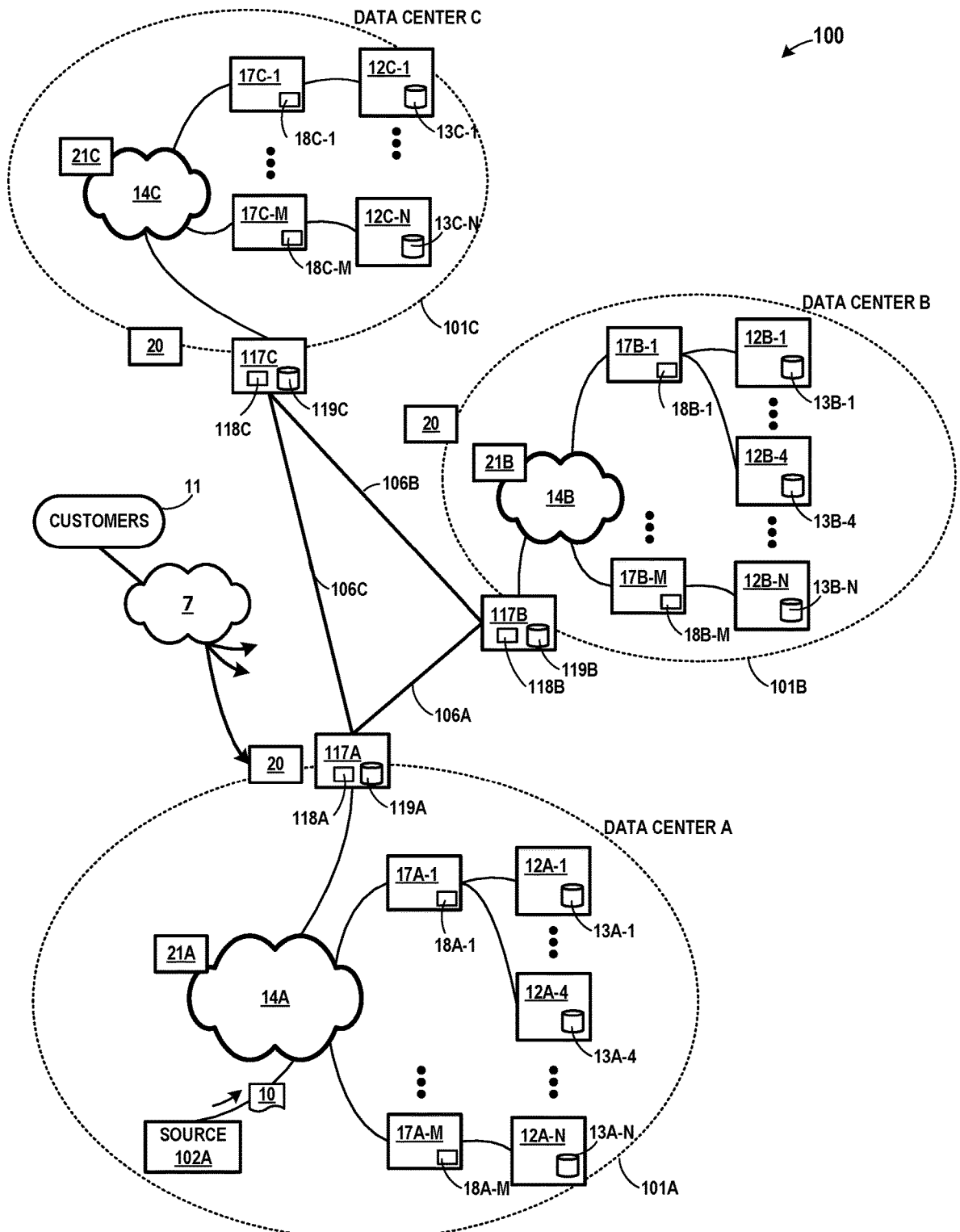
FIG. 1 is a conceptual diagram illustrating an example system having multiple data centers, in accordance with one or more aspects of the present disclosure.

FIG. 1 is a conceptual diagram illustrating an example system having multiple data centers, in accordance with one or more aspects of the present disclosure. The example of FIG. 1 includes data center 101A, 101B, and 101C (collectively "data centers 101") in which examples of the techniques described herein may be implemented. In general, each of data centers 101 provide an operating environment for applications and services for customers 11 coupled to data centers 101 by content/service provider network 7 and gateway devices 20 (connection from network 7 to gateway device 20 shown for data center 101A, but for ease of illustration in FIG. 1, corresponding connections from network 7 are not shown for data centers 101B and 101C). In other examples, content/service provider network 7 may be a data center wide-area network (DC WAN), private network or other type of network. Data centers 101 may, for example, host infrastructure equipment, such as compute nodes, networking and storage systems, redundant power supplies, and environmental controls.

Three data centers 101 are illustrated in FIG. 1. In other examples, however, any number of data centers may be included within system 100. Content/service provider network 7 may be coupled to one or more networks administered by other providers, and may thus form part of a large-scale public network infrastructure, e.g., the internet. Although described for purposes of example in reference to data centers, the techniques described herein may, in some example implementations, be applied to computer networks generally, including access networks, enterprise networks, service provider networks, other types of distributed and/or redundant data centers, or other computing environments.

In some examples, data centers 101 may represent geographically distributed network data centers. In FIG. 1, each of data centers 101 are connected by a direct link (e.g., links 106A, 106B, 106C). Each of data centers 101 may be a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In the example shown, data center 101A includes a set of storage systems and application server nodes 12A interconnected via a high-speed switch fabric 14A, data center 101B includes a set of storage systems and application server nodes 12B interconnected via a high-speed switch fabric 14B, and data center 101C includes a set of storage systems and application server nodes 12C interconnected via a high-speed switch fabric 14C. In some examples, server nodes included within data center 101A (e.g., server nodes 12A-1, 12A-2, 12A-3, 12A-4, . . . 12A-N, or collectively, "server nodes 12A"), server nodes included within data center 101B (e.g., server nodes 12B-1, 12B-2, 12B-3, 12B-4, 12B-N, or collectively, "server nodes 12B"), and server nodes included within data center 101C (e.g., server nodes 12C-1 . . . 12C-N, or collectively, "server nodes 12C" and generally "server nodes 12") are arranged into multiple different server groups. Each group may include any number of servers up to, for example, "N" server nodes $12A_1$-$12A_N$ and $12B_1$-$12B_N$. As shown in FIG. 1, each of server nodes 12A and 12B (or generally, "a server node 12") includes one or more storage devices. Specifically, in the example of FIG. 1, server nodes 12A, 12B, and 12C include one or more storage devices (e.g., storage devices 13A-1 . . . 13A-N, collectively "storage devices 13A"), each of server nodes 12B include one or more storage devices (e.g., storage devices 13B-1 . . . 13B-N, collectively "storage devices 13B"), and each of server nodes 12C include one or more storage devices (e.g., storage devices 13C-1 . . . 13C-N, collectively "storage devices 13C"). Storage devices 13A, 13B, and 13C may, in some examples, be a hard drive or other non-volatile storage. Server nodes 12A, 12B, and 12C provide computation and storage facilities for applications and data associated with customers 11 and may be physical (bare-metal) servers, virtual machines running on physical servers, virtualized containers running on physical servers, or combinations thereof. In some examples, and as illustrated in FIG. 1, each instance of switch fabric 14A, 14B, and 14C may function as (or be part of) a local area network within data center 101A, data center 101B, and data center 101C, respectively.

As shown in FIG. 1, access nodes 17A-1 through 17A-N (collectively, "access nodes 17A" or generally, "access nodes 17") within data center 101A, access nodes 17B-1 through 17B-N (collectively, "access nodes 17B") within data center 101B, and access nodes 17C-1 through 17C-N (collectively, "access nodes 17C") within data center 101C may be connected to one or more server nodes 12A, 12B, and 12C respectively. As further described herein, each of access nodes 17A, 17B, 17C (or generally, "an access node 17") may be used for processing streams of information, such as network packets or storage packets. As used in FIG. 1 and elsewhere in describing elements of other illustrations, "N" is any number so that, for example, access nodes 17A-1 through 17A-N represent any number of access nodes 17A.

Also, as further described herein, source device 102A is a device within data center 101A that acts as a source for one or more data write operations. Source device 102A may, in some examples, be implemented as an access node 17A, a server node 12A, or a combination of an access node 17A and server node 12A.

In the example of FIG. 1, one or more software-defined networking (SDN) controllers 21 (e.g., SDN controller 21A and SDN controller 21B and SDN controller 21C) may serve as a high-level controller for configuring and managing the routing and switching infrastructure of data centers 101. Each of SDN controllers 21 may provide a logically and in some cases physically centralized controller for facilitating operation of one or more virtual networks within each of data centers 101 in accordance with one or more aspects of this disclosure. In some examples, SDN controllers 21 may operate in response to configuration input received from a network administrator.

Although such devices might not be shown in FIG. 1, each of data centers 101 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

Within each of data centers 101A, 101B, and 101C illustrated in FIG. 1, each of server nodes 12 may be coupled to switch fabric 14 (e.g., switch fabric 14A, 14B, 14C) by an access node 17 for processing streams of information, such as network packets or storage packets. In one example, each access node 17 is a highly programmable I/O processor specially designed for offloading certain functions from server nodes 12 and may include one or more processing cores consisting of a number of internal processor clusters, e.g., MIPS cores, equipped with hardware engines that offload cryptographic functions, compression and regular expression (RegEx) processing, data storage functions and networking operations. In this way, each access node 17 includes components for fully implementing and processing network and storage stacks on behalf of one or more server nodes 12. In addition, access nodes 17 may be programmatically configured to serve as a security gateway for its respective server nodes 12, freeing up the processors of the servers to dedicate resources to application workloads. In some example implementations, each access node 17 may be viewed as a network interface subsystem that implements full offload of the handling of data packets (with zero copy in server memory) and storage acceleration for the attached server systems. In one example, each access node 17 may be implemented as one or more application-specific integrated circuit (ASIC) or other hardware and software components, each supporting a subset of the servers. Each of access nodes 17 may include high speed and/or high bandwidth memory 18.

In FIG. 1, data center 101A and data center 101B are connected by link 106A through gateway 117A and gateway 117B (collectively "gateways 117"). Similarly, data center 101A and data center 101C are connected by link 106C, and data center 101B and data center 101C are connected by link 106B. As further described herein, when a device in data center 101A writes data to a device outside of data center 101, such as one or more server nodes 12B in data center 101B, gateway 117A and/or gateway 117B may output early acknowledgments. Such early acknowledgements may, in some examples, result in increased throughput for a series of data transfer or write operations. Each of gateways 117 in FIG. 1 include one or more memory devices 118 and one or more stable storage devices 119. Each of memory devices 118 may be volatile storage, such as high-speed memory or high bandwidth memory used to buffer data in transit to a storage location. Each of stable storage devices 119 may be a non-volatile storage device that is resistant to power outages and/or other exceptional events or circumstances that may otherwise jeopardize stored data (e.g., when power is lost, or one or more connections are cut). In some examples each of stable storage devices 119 are implemented as a solid-state storage device. Also, as further described herein, each of gateways 117 may be implemented as, or may include, one or more access nodes 17 that are similar to or the same as access nodes 17A and access nodes 17B deployed within data center 101A and data center 101B. Further, each of gateways 117 may be integrated into, be a part of, replace, and/or include functionality of gateways 20.

In example implementations, access nodes 17 are configurable to operate in a standalone network appliance having one or more access nodes. In other examples, each access node may be implemented as a component (e.g., electronic chip) within a device, such as a compute node, application server, storage server, and may be deployed on a motherboard of the device or within a removable card, such as a storage and/or network interface card. Further, access nodes 17 may be arranged into multiple different access node groups (e.g., see FIG. 3), each including any number of access nodes up to, for example, M access nodes $17A_1$-$17A_M$ in data center 101A and/or M access nodes $17B_1$-$17B_M$ in data center 101B. As such, multiple access nodes 17 may be grouped (e.g., within a single electronic device or network appliance) as an access node group for providing services to a group of servers supported by the set of access nodes internal to the device. In one example, an access node group may comprise four access nodes 17, each supporting four servers so as to support a group of sixteen servers.

In the example of FIG. 1, each access node 17 provides connectivity to switch fabric 14 for a different group of server nodes 12 and may be assigned respective IP addresses and provide routing operations for the server nodes 12 coupled thereto. As described herein, access nodes 17 provide routing and/or switching functions for communications from/directed to the individual server nodes 12. For example, as shown in FIG. 1, each access node 17 includes a set of edge-facing electrical or optical local bus interfaces for communicating with a respective group of server nodes 12 and one or more core-facing electrical or optical interfaces for communicating with core switches within switch fabric 14. In addition, access nodes 17 described herein may provide additional services, such as storage (e.g., integration of solid-state storage devices), security (e.g., encryption), acceleration (e.g., compression), I/O offloading, and the like. In some examples, one or more of access nodes 17 may include storage devices, such as high-speed solid-state drives or rotating hard drives, configured to provide network accessible storage for use by applications executing on the servers. Various example architectures of access nodes 17 are described herein. In some examples, the architecture of each access node 17 comprises a multiple core processor system that represents a high performance, hyper-converged network, storage, and data processor and input/output hub. In these examples, the architecture of each access node 17 is optimized for high performance and high efficiency stream processing.

More details on the data center network architecture and example access nodes are available in U.S. patent application Ser. No. 15/939,227, filed Mar. 29, 2018, entitled "Non-Blocking Any-to-Any Data Center Network with Packet Spraying Over Multiple Alternate Data Paths,", U.S. Provisional Patent Application Ser. No. 62/589,427, filed Nov. 21, 2017, entitled "WORK UNIT STACK DATA STRUCTURES IN MULTIPLE CORE PROCESSOR SYSTEM,", U.S. patent application Ser. No. 16/031,921, filed Jul. 10, 2018, entitled "DATA PROCESSING UNIT FOR COMPUTE NODES AND STORAGE NODES,", U.S. patent application Ser. No. 16/031,676, filed Jul. 10, 2018, entitled "ACCESS NODE FOR DATA CENTERS,", and U.S. Provisional Patent Application Ser. No. 62/682,687, filed Jun. 8, 2018, entitled "EARLY ACKNOWLEDGMENT FOR WRITE OPERATIONS,", the entire content of each of which is incorporated herein by reference.

Although not shown in FIG. 1, access nodes 17 within each of data centers 101 may be directly coupled to each other, such as direct coupling between access nodes in a common access node group, to provide direct interconnectivity between the access nodes of the same group. For example, multiple access nodes 17 (e.g., 4 access nodes) may be positioned within a common access node group for servicing a group of servers (e.g., 16 servers).

As one example, each access node group of multiple access nodes 17 may be configured as standalone network device, and may be implemented as a two rack unit (2RU) device that occupies two rack units (e.g., slots) of an equipment rack. In another example, access node 17 may be integrated within a server, such as a single 1RU server in which four CPUs are coupled to the forwarding ASICs described herein on a mother board deployed within a common computing device. In yet another example, one or more of access nodes 17 and server nodes 12 may be integrated in a suitable size (e.g., 10RU) frame that may, in such an example, become a network storage compute unit (NSCU) for data center 10 (see, e.g., FIG. 5 and FIG. 6). For example, an access node 17 may be integrated within a mother board of a server node 12 or otherwise co-located with a server in a single chassis.

In some examples, but not all examples, access nodes 17 may interface and utilize switch fabric 14 so as to provide resilient, full mesh (any-to-any) interconnectivity such that any of server nodes 12 may communicate packet data for a given packet flow to any other of the servers using any of a number of parallel data paths within the data center 10. For instance, example network architectures and techniques are described herein (or in related applications) in which access nodes, in such implementations, spray individual packets for packet flows between the access nodes and across some or all of the multiple parallel data paths in the data center switch fabric 14 and reorder the packets for delivery to the destinations so as to provide full mesh connectivity. In some examples, data centers 101 and/or other networks described herein may utilize a data transmission protocol referred to as a Fabric Control Protocol (FCP), which may be used by the different operational networking components of any of access nodes 17 to facilitate communication of data across switch fabric 14A and/or switch fabric 14B. FCP is an end-to-end admission control protocol in which, in one example, a sender explicitly requests a receiver with the intention to transfer a certain number of bytes of payload data. In response, the receiver issues a grant based on its buffer resources, QoS, and/or a measure of fabric congestion. In general, FCP enables spray of packets of the same packet flow to all paths between a source and a destination node, and may provide advantages, including resilience against request/grant packet loss, adaptive and low latency fabric implementations, fault recovery, reduced or minimal protocol overhead cost, support for unsolicited packet transfer, support for FCP capable/incapable nodes to coexist, flow-aware fair bandwidth distribution, transmit buffer management through adaptive request window scaling, receive buffer occupancy based grant management, improved end to end QoS, security through encryption and end to end authentication and/or improved ECN marking support. Further details about FCP are available in U.S. Provisional Patent Application No. 62/566,060, filed Sep. 29, 2017, entitled "FABRIC CONTROL PROTOCOL FOR DATA CENTER NETWORKS WITH PACKET SPRAYING OVER MULTIPLE ALTERNATE DATA PATHS,".

Typically, for write operations performed within a network, such as the network(s) included within system 100 of FIG. 1, a source device waits for end-to-end acknowledgements from destination device(s) before assuming that the data has been stored reliably and/or initiating a new write operation. For instance, in an example where source device 102A seeks to write data 10 to server node 12A-1 in FIG. 1, source device 102A outputs a signal over switch fabric 14A. Server node 12A-1 receives a signal over switch fabric 14A (e.g., through access node 17A-1) and determines that the signal corresponds to data to be stored at storage device 13A-1 within server node 12A-1. Server node 12A-1 stores the data in storage device 13A-1. Once data 10 is stored at storage device 13A-1, server node 12A-1 sends an acknowledgment to source device 102A over switch fabric 14A. When source device 102A receives the acknowledgment over switch fabric 14A, source device 102A concludes that data 10 has been stored reliably at server node 12A-1, and may thereafter initiate a new write operation and/or perform additional operations.

Similarly, in a geographically-distributed data center, a data source within data center 101A that writes data 10 to a storage device within data center 101B may typically wait for an end-to-end acknowledgment before assuming that data 10 has been stored reliably. For instance, in the example of FIG. 1, to store data 10 at server node 12B-1, source device 102A outputs a signal over switch fabric 14A. Gateway 117A detects a signal over switch fabric 14A and determines that the signal includes data intended for a storage device outside of data center 101A. Gateway 117A outputs a signal over link 106A. Gateway 117B detects a signal and determines that the signal includes data intended for server node 12B-1. Gateway 117B outputs a signal over switch fabric 14B. Server node 12B-1 detects a signal over switch fabric 14B (through access node 17B-1) and stores data 10 included within the signal in storage device 13B-1. Once data 10 has been stored at storage device 13B-1, server node 12B-1 sends an acknowledgment back to source device 102A by sending a signal through access node 17B-1, over switch fabric 14B, through gateway 117B, over link 106A, through gateway 117A, and over switch fabric 14A. Source device 102A detects a signal over switch fabric 14A and determines that the signal corresponds to an end-to-end acknowledgment that data 10 has been stored successfully at server node 12B-1.

In the examples described above, for both the local and remote cases, source device 102A waits a relatively long time to receive an acknowledgement. For instance, although round-trip data transmission times within a data center (e.g., data center 101A) may be relatively fast (e.g., on the order of 10 microseconds), data transmission times between geographically-distributed data centers may be much slower (e.g., on the order of 1 millisecond for data centers 100 km apart). Further, write latencies to disk storage may be even slower, on the order of 5 milliseconds (write latencies to solid state storage devices are often faster, but are still relatively slow, and may require on the order of 800 microseconds). Therefore, in the examples described above, source device 102A might wait for 5 to 10 milliseconds to receive an acknowledgment for a data write to disk storage. And where source device 102A precludes or limits new write operations while waiting on an acknowledgement for a prior write, the rate at which source device 102A is able to perform a sequence of write operations to locations within data center 101A and data center 101B will be relatively slow if the procedure described above is followed.

To improve the rate at which write operations may be performed, source device 102A may write larger blocks of data, thereby amortizing the latency across larger amounts of data. However, this approach has several drawbacks. For instance, the intervening network infrastructure may become more complicated and expensive if larger blocks of data are used for write operations. Further, batching operations is analogous to transmitting large packets, which is an anti-packet switching approach, and may reduce or eliminate any statistical multiplexing gains that might otherwise be achieved from packet-oriented communications. Further, the performance of a system tends to correlate positively with the rate at which it can perform short operations, which suggests that larger blocks are not optimal.

In accordance with one or more aspects of the present disclosure, an early acknowledgment approach may be used to improve the rate of write operations. In some conventional approaches, end-to-end acknowledgements are often used to ensure reliable transport of data to be stored, since data is susceptible to being lost while being transported to storage. There are multiple sources of failure that can cause data loss, including transmission bit errors, congestion that causes packet drops, storage (hard drive or solid-state drive) failures, failures of the data center or facility itself (e.g. power outages or severed connections), and others. In many cases, congestion that causes packets to be dropped is one of the most significant sources of failure, and a cost might be attributed to failures due to congestion that is orders of magnitude higher than the other mentioned sources of failure. Accordingly, reducing or eliminating packet loss due to congestion in the network is desirable, and if eliminated or significantly reduced, might remove the need for end-to-end acknowledgements for writes. And if end-to-end acknowledgments are not necessary, the throughput of multiple write operations can be increased substantially.

Accordingly, in the example of FIG. 1, one or more devices within data centers 101 may issue an early acknowledgement to a source device writing to server node 12B-1 within remote data center 101B. For instance, in an example that can be described in connection with FIG. 1, source device 102A outputs a signal over switch fabric 14A. Gateway 117A detects a signal over switch fabric 14A and determines that the signal includes data intended for storage outside data center 101A. Gateway 117A may further determine that the data is intended for storage at one or more server nodes 12B within data center 101B. Gateway 117A stores data 10 within memory 118A, and begins transmitting data 10 to gateway 117B over link 106A. After gateway 117A outputs all of data 10 over link 106A, or at least after gateway 117A places the last bit of data 10 on link 106A, gateway 117A outputs an acknowledgment over switch fabric 14A, which may be before data 10 is actually stored at the intended storage device(s) located outside of data center 101A. Source device 102A receives a signal over switch fabric 14A and determines that the signal corresponds to an acknowledgement that the data can be assumed to have been stored successfully at its destination at server node 12B-1. Once source device 102A receives such an acknowledgment, source device 102A may be free to initiate another write operation and/or communicate with other devices (including outside of data center 101A) that the write has been completed. The acknowledgement in this example is received by source device 102A more quickly than if source device 102A were to wait on an end-to-end acknowledgment from server node 12B-1, given the transmission time to server node 12B-1 and the disk write latency of server node 12B-1.

Gateway 117B may continue the process of storing data 10 at server node 12B-1 by acknowledging the receipt of data 10 from gateway 117A. For instance, gateway 117B receives data 10 over link 106A from gateway 117A. Gateway 117B outputs a signal over link 106A. Gateway 117A detects a signal and determines that the signal corresponds to an acknowledgment that gateway 117B has received data 10.

Gateway 117B may continue the process of storing data 10 at server node 12B-1 by transmitting the data to access node 17B-1. For instance, gateway 117B outputs a signal over switch fabric 14B. Access node 17B-1 detects a signal over switch fabric 14B and determines that the signal includes data intended for storage at server node 12B-1. Access node 17B-1 stores the data in memory 18B-1 and outputs an acknowledgment over switch fabric 14B. In some examples, access node 17B-1 may output the acknowledgment before the data is actually stored at storage device 13B-1 within server node 12B-1. In other examples, access node 17B-1 may wait until the data is stored at storage device 13B-1. Gateway 117B receives a signal over switch fabric 14B and determines that the signal corresponds to acknowledgment that the data can be assumed to have been stored successfully at server node 12B-1.

Access node 17B-1 may complete the process of storing data 10 at server node 12B-1. For instance, access node 17B-1 outputs data 10 to server node 12B-1. Server node 12B-1 stores data 10 in storage device 13B-1. Access node 17B-1 receives an indication from server node 12B-1 (or otherwise determines) that data 10 has been successfully stored at storage device 13B-1. Once access node 17B-1 determines that the data has been successfully stored at storage device 13B-1, access node 17B-1 may deallocate the storage associated with data 10 stored in memory 18B-1.

In examples where link 106A is a direct connection between data center 101A and data center 101B, it is unlikely that packets or data will be lost between gateway 117A and gateway 117B due to congestion. However, such data might not arrive safely at gateway 117B for a number of reasons, including bit errors, failure or loss of connectivity affecting link 106A (e.g., link 106A is cut), a failure of gateway 117B, or other reasons.

Accordingly, gateway 117A and gateway 117B may communicate using a combination of forward error correction and/or retransmissions to ensure that data is transferred reliably from gateway 117A to gateway 117B. Gateway 117A and gateway 117B may, for example, prevent bit errors through sufficient parity bits and/or error correcting codes for data communicated over link 106A. Alternatively, or in addition, gateway 117A and gateway 117B may also address such errors through an acknowledgment and/or retransmission scheme. In one such example, if gateway 117A transmits data to gateway 117B over link 106A, but gateway 117A does not receive an acknowledgment from gateway 117B, gateway 117A may retransmit the data to gateway 117B, and may continue to do so until a timely acknowledgment is received. Accordingly, gateway 117A may, in some examples, retain data 10 until gateway 117A is able to confirm that data 10 has been successfully transferred to gateway 117B.

In some examples, gateway 117A may also include one or more stable storage devices 119A, which gateway 117A may use in situations where the security of the data may be threatened, such as when gateway 117A detects a power outage or a connection outage involving data center 101A, link 106, and/or data center 101B. For instance, in one example, gateway 117A may detect a power outage. In response, and while operating on backup power, gateway 117A may store some or all data held in memory 118A to stable storage 119A. Eventually, gateway 117A may later detect that power has been restored. Upon detecting that power has been restored, gateway 117A may resume operations by reading data previously stored in stable storage 119A back into memory 118A, and then continuing normal operations. In the example described, since switch fabric 14B represents an independently reliable transport network for transferring data within data center 101B, once data 10 is safely stored within gateway 117B, it may be appropriate to assume that switch fabric 14B will ensure that data 10 will successfully reach its destination at server node 12B-1. In some examples, stable storage 119A may be a non-volatile storage device (e.g., solid state storage) that is resistant to power outages and/or other exceptional events or circumstances that may otherwise jeopardize stored data.

In at least some of the examples described above in connection with FIG. 1, gateway 117A outputs an acknowledgment over switch fabric 14A when gateway 117A has finished transmitting all of the data over link 106A. Such an acknowledgment may be communicated over switch fabric 14A to source device 102A before the data is successfully stored within data center 101B, or even before gateway 117B acknowledges to gateway 117A that data 10 has been received over link 106A. Therefore, in the event of a catastrophic error to data center 101A (or to gateway 117A specifically), gateway 117A might not be able to successfully retransmit the data to gateway 117B if gateway 117B does not successfully receive data 10 over link 106A. Accordingly, gateway 117A may replicate data 10 to one or more other data centers 101, beyond just data center 101B, in order to ensure data 10 is available outside data center 101A in the event of a catastrophic error affecting data center 101A (or otherwise affecting gateway 117A).

In one such example, gateway 117A may replicate data 10 to data center 101C. For instance, again referring to FIG. 1, source device 102A outputs a signal over switch fabric 14A. Gateway 117A detects a signal over switch fabric 14A and determines that the signal includes data intended for storage within data center 101B. Gateway 117A stores data 10 within memory 118A, and begins transmitting data 10 to gateway 117B over link 106A, and also, to gateway 117C over link 106C. After gateway 117A outputs all of data 10 over link 106A and also, all of data 10 over link 106C (or at least after gateway 117A places the last bit of data 10 on both link 106A and link 106C), gateway 117A outputs an acknowledgment over switch fabric 14A to source device 102A, indicating that data 10 can be safely assumed to be stored within data center 101B.

In the event of a catastrophic failure to data center 101A that affects gateway 117A after the data is placed on links 106A and 106C, gateway 117B may still receive data 10 over link 106A, and complete the storage of data 10 within server node 12B-1 (since gateway 117A successfully placed data 10 on link 106A before the catastrophic failure). Alternatively, server node 12B-1 (e.g., if gateway 117B is unavailable) may access data 10 from data center 101C (i.e., gateway 117C), and thereby complete the operation of writing data 10 to server node 12B-1. Accordingly, if gateway 117A replicates or mirrors data 10 to data center 101C, system 100 may use an early acknowledgment procedure involving gateway 117A that is resilient to a complete failure of data center 101A.

In general, gateway 117A may use a data durability or disaster recovery scheme, such as an erasure coding scheme, to protect against catastrophic or other failures of data center 101A. For instance, in some examples, and rather than fully replicating data 10 to data center 101C, gateway 117A may split data 10 into a number of segments, generate additional parity segments, and store each of the data and parity segments across system 100 within different data centers 101 to provide resilience against a failure of data center 101A (or in general, of other data centers 101). In one such example, and again referring to FIG. 1, source device 102A outputs a signal over switch fabric 14A. Gateway 117A detects a signal over switch fabric 14A and determines that the signal includes data intended for storage within data center 101B. Gateway 117A splits data 10 into a number of segments, generates additional segments, and begins transmitting the segments across system 100 to different data centers 101. For example, where gateway 117A uses an erasure coding scheme that involves splitting data 10 into 6 segments and generating 2 additional parity segments, gateway 117A may send each of the eight segments to as many as eight different data centers 101 (e.g., although not shown in FIG. 1, system 100 may include eight data centers 101 in such an example, each connected to gateway 117A through a direct link 106). Each of gateways 117 within those receiving data centers 101 receives a data or parity segment and stores the segment within a respective memory 118. Once gateway 117A outputs the last bit of each the segments over a direct link 106 to each segment's destination gateway 117, gateway 117A outputs an acknowledgment over switch fabric switch fabric 14A to source device 102A, indicating that data 10 can be safely assumed to be stored within data center 101B. In the event of a catastrophic failure to data center 101A, server node 12B may reconstruct data 10 from a sufficient number of segments stored within data centers 101 across system 100. By storing data 10 as segments across data centers 101 within system 100 in the manner described, system 100 is resilient to data loss, and the storage and other overhead for such resilience is less than the overhead required of a full replication of data 10 to data center 101C (which may be considered a special case of a data durability scheme), as described in the earlier example.

In the examples described above, where source device 102A initiates a write operation to one or more devices within data center 101B, source device 102A receives an acknowledgment very quickly. Source device 102A might only have to wait tens of microseconds for the acknowledgment, since the round trip transmission time within data center 101A will likely be on the order of tens of microseconds, and the latency for storing data within memory 18A-1 of access node 17A-1 and placing data 10 on link 106A may also be low.

Further, even where gateway 117A transmits data to one or more data centers 101 in parallel, including splitting the data and storing it across gateways 117 (for each of data centers 101) pursuant to a data durability scheme, may result in little or no increased latency. Accordingly, in the example described, source device 102A may very quickly receive an acknowledgement for a data write operation performed within data center 101A, even if a data durability scheme is employed in the manner described.

By storing the data segment and parity segments across gateways 117 (or data centers 101) in the manner described, system 100 is resilient to data loss, because in at least some situations, lost data can be reconstructed from a subset of the data and parity segments. For instance, in some examples, gateway 117A may split the data into K equal segments and generate P parity segments so that K+P=N. In such an example, an erasure coding scheme may be used to protect against failures of data centers 101 and/or other gateways 117 that do not exceed "P" (or N−K) failures. The resilience overheads for both network and storage can be kept small by keeping (N−K)/K≪1. Further information about use of data durability schemes in related contexts may be found in U.S. patent application Ser. No. 16/169,736, filed Oct. 24, 2018 entitled "Inline Reliability Coding For Storage On A Network,", the entire content of which is incorporated herein by reference in its entirety.

Further, through techniques in accordance with one or more aspects of the present disclosure, such as by transferring ownership of the responsibility for completing write operations to other devices within the path between the source device and the destination device, system 100 may enable early acknowledgements to be sent to devices along the path between the source device and the destination device. By transferring responsibility in this way, system 100 may increase throughput for write operations because sending early acknowledgements may have the effect of enabling a source device to initiate a subsequent write operation more quickly.

Still further, through techniques in accordance with one or more aspects of the present disclosure, such as by outputting early acknowledgments to source devices, system 100 may make a series of write operations largely independent of the latency of the elements in the path between the source device and the destination device. By making write operations independent of the latency of the elements in the path, system 100 may increase throughput for write operations by making the rate of write operations primarily dependent on the bandwidth of the path rather than the latencies of elements within the path.

Figure 2:
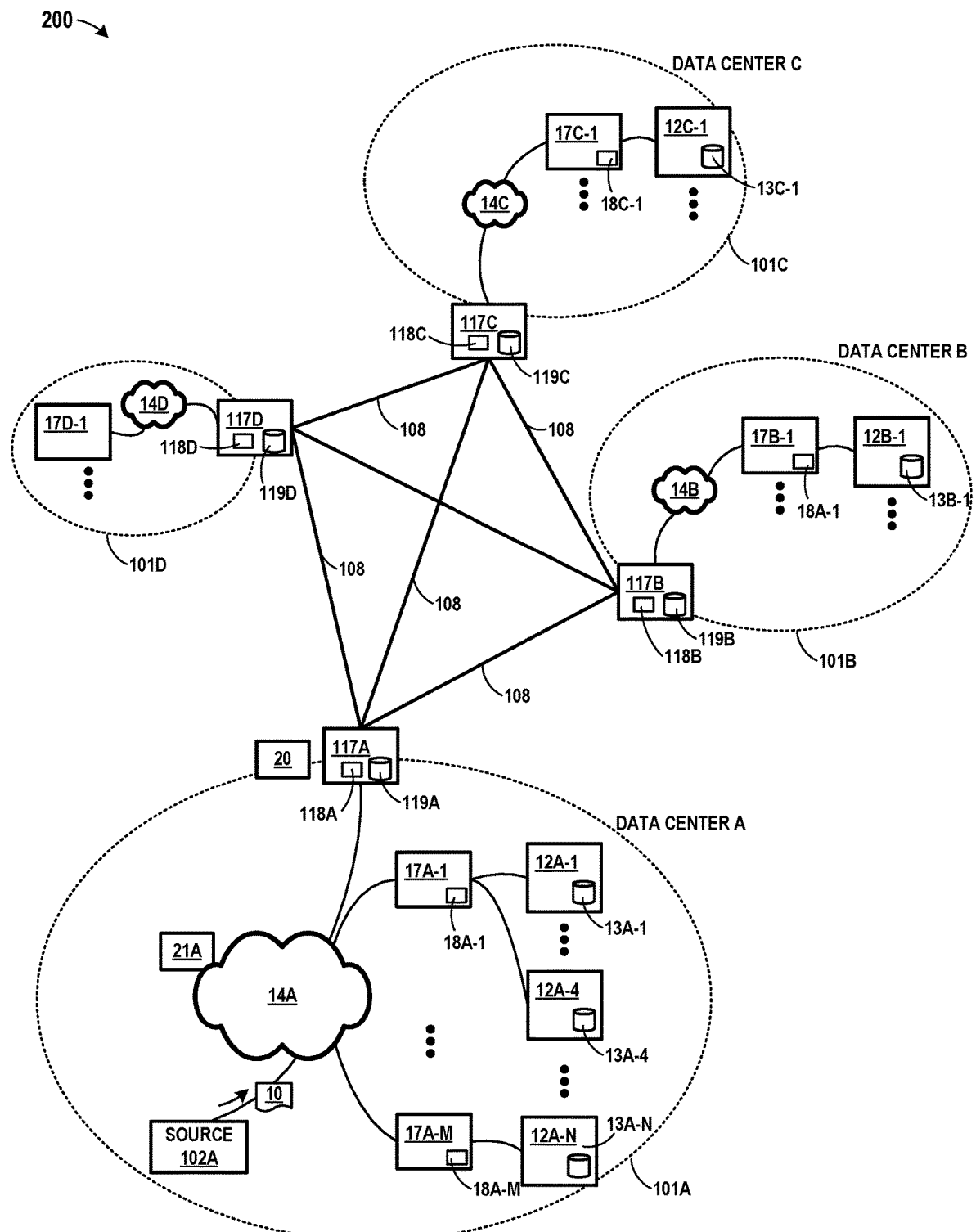
FIG. 2 is a conceptual diagram illustrating an example system having multiple data centers that communicate through a remote replication procedure.

FIG. 2 is a conceptual diagram illustrating an example system having multiple data centers that communicate through a synchronous remote replication procedure. FIG. 2 includes data centers 101A, 101B, 101C, and 101D (collectively "data centers 101") that each provide an operating environment for applications and servers for customers, in a manner similar to that described in connection with FIG. 1. Also, as in FIG. 1, each of data centers 101 in FIG. 2 may host infrastructure equipment, compute nodes, networking and storage systems, redundant power supplies, and environmental controls. In general, systems, devices, and components illustrated in FIG. 2 may correspond to like-numbered systems, devices, components, and entities illustrated in FIG. 1, and may be described in a manner consistent with the description provided in connection with FIG. 1.

One or more of data centers 101 may be remotely located relative to other data centers 101 illustrated within FIG. 2. Each of data centers 101 includes respective gateways 117A, 117B, 117C, and 117D (collectively "gateways 117") for communicating between data centers 101. Each of data centers 101 includes respective switch fabrics 14A, 14B, 14C, and 14D (collectively "switch fabrics 14") for communication between devices within each respective data center 101. In the examples described, each of switch fabrics 14 represent independently reliable transport networks for transferring data within each respective data center 101. Data centers 101 are each connected to each other by links 108. In the example of FIG. 2, each of links 108 may be a direct link between gateways 117 for each respective data center 101.

Synchronous remote replication in database systems may provide a disaster recovery solution where no updates are lost. However, the ability to recover from disaster comes at the price of adding the round-trip communication latency to the remote site for each transaction commit operation. This additional latency slows down the transaction rate and the overall performance of the database system.

As a result, many implementations opt for asynchronous replication, whereby the transaction is committed locally (with much lower latency) and the replication is done in the background. In such a scheme, some updates may be lost during disaster recovery. Accordingly, it is difficult to achieve both lossless recovery and performance. However, system 200 illustrates an architecture where lossless recovery may be achieved while maintaining low latency for wide area data reliability for database systems and other types of storage systems.

In the example of FIG. 2, each of gateways 117 within system 200 communicate through a publish-subscribe system that spans data centers 101. Each of gateways 117 may record data such that the acknowledgment is generated locally, within the data center 101 associated with a given gateway 117. Subscribers in other data centers 101 receive data asynchronously with the guarantee that all of the data that has been acknowledged to the publisher will be provided to its subscribers. In some examples, a primary database server (e.g., source device 102A) may support its normal function of performing transaction updates. In addition to performing local updates, the primary database server publishes each update (e.g., a log record) to the publishing system illustrated in FIG. 2 connecting each of data centers 101. A secondary database (e.g., executing on server node 12B-1 of data center 101B) is a subscriber to the updates published by the primary database server in data center 101A and continuously receives the updates and applies them to its local copy of the database. In case of a disaster at the data center housing the primary database server (e.g., data center 101A), no new updates are published, and all existing updates are received and applied at data center 101B, the data center housing the secondary database server executing on server node 12B-1. The secondary database server can thereafter serve as the primary database server without any loss of updates.

Accordingly, in the example of FIG. 2, and in accordance with one or more aspects of the present disclosure, gateway 117A may act as a publisher to a subscriber within 101B. For instance, in one such example, gateway 117A receives data 10 from source device 102A within data center 101A. Gateway 117A assigns data 10 a monotonically increasing sequence number. Gateway 117A transmits data 10 over link 108 between data center 101A and data center 101B. Gateway 117A outputs an acknowledgment over switch fabric 14A to source device 102A as soon as gateway 117A transmits data 10 over link 108 to data center 101B. Gateway 117A may locally buffer data 10 asynchronously. Gateway 117B receives data 10, and delivers data 10 to the subscriber within data center 101B in the order of the sequence number associated with data 10. Gateway 117A and gateway 117B may each include memory devices 118 and/or stable storage devices 119 to save pending data that has not been consumed by the subscriber.

In some examples, gateway 117A may replicate data 10 to multiple data centers 101 (e.g., using an erasure coding scheme). For instance, still referring to FIG. 2, gateway 117A receives data 10 from source device 102A within 101A. Gateway 117A transmits data 10 over link 108 to gateway 117B for delivery to a subscriber within data center 101B. Alternatively or in addition, gateway 117A splits data 10 into a number of segments and generates additional parity segments. Gateway 117A transmits each of the segments to different data centers 101. Once gateway 117A has transmitted all of the segments to the other gateways 117 (each possibly associated with a different data center 101), gateway 117A outputs an acknowledgment over switch fabric 14A to source device 102A. In some examples, each segment may be transmitted to a different data center, but in other examples, some data centers might receive more than one segment. Further, in some examples, some of data centers 101 that receive a segment might not be subscribers. For instance, data center 101D might not subscribe to the data being published by gateway 117A, yet gateway 117D might receive one or more segments from gateway 117A.

Figure 3:
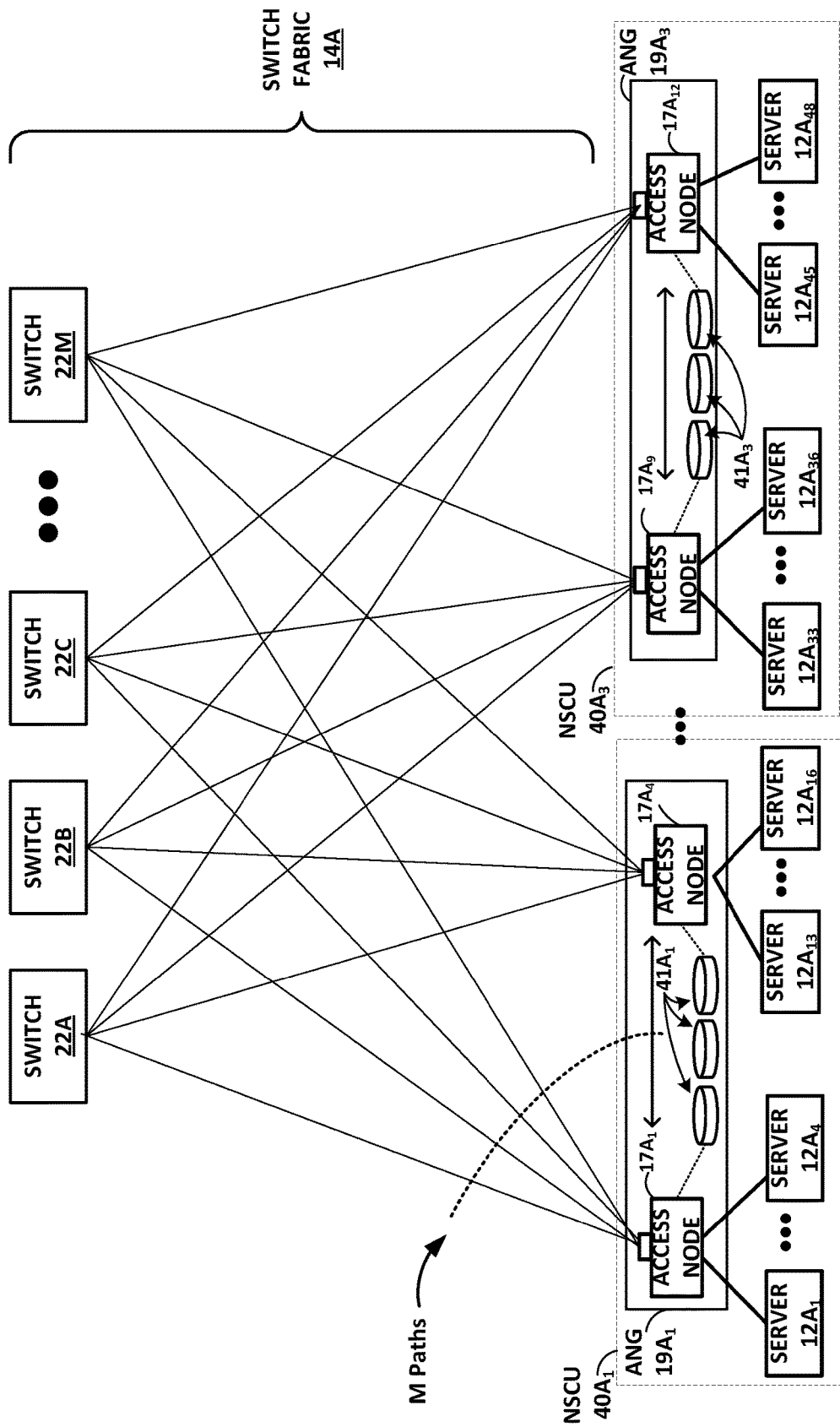
FIG. 3 is a block diagram illustrating in further detail the logical interconnectivity provided by access nodes and switch fabric within an example data center, in accordance with one or more aspects of the present disclosure.

FIG. 3 is a block diagram illustrating in further detail the logical interconnectivity provided by access nodes 17A and switch fabric 14A within an example data center, such as data center 101A illustrated in FIG. 1 and FIG. 2. Although FIG. 3 is primarily described in terms of access nodes 17A, server nodes 12A, and switch fabric 14A for data center 101A, a similar arrangement and description may apply to access nodes 17B, server nodes 12B, and switch fabric 14B of data center 101B. Further, as described herein in connection with FIG. 3 and other illustrations, local area networks included within each of data center 101A-101D may be implemented in the manner illustrated in FIG. 3, and each may use Fabric Control Protocol (FCP) as described herein. However, in other examples, each of data centers 101A through 101D may be configured differently and/or use a different reliable transport protocol for communications within each such data center.

As shown in the example of FIG. 3, access nodes 17A and switch fabric 14A may be configured to provide full mesh interconnectivity such that access nodes 17A may communicate packet data for any of server nodes 12A to any other of the server nodes 12A using any of a number of M parallel data paths to any of core switches 22A-22M (collectively "core switches 22"). Moreover, according to the techniques described herein, access nodes 17A and switch fabric 14A may be configured and arranged in a way such that the M parallel data paths in switch fabric 14A provide reduced L2/L3 hops and full mesh interconnections (e.g., bipartite graph) between server nodes 12A, even in massive data centers having tens of thousands of servers. Note that in this example, switches 22 are not connected to each other, which makes it much more likely that any failure of one or more of the switches will be independent of each other. In other examples, the switch fabric itself may be implemented using multiple layers of interconnected switches as in a CLOS network.

In some example implementations, each access node 17A may have multiple parallel data paths for reaching any given other access node 17A and the server nodes 12A reachable through those access nodes. In some examples, rather than being limited to sending all of the packets of a given flow along a single path in the switch fabric, switch fabric 14A may be configured such that access nodes 17A may, for any given packet flow between server nodes 12A, spray the packets of the packet flow across all or a subset of the M parallel data paths of switch fabric 14A by which a given destination access node 17A for a destination server node 12A can be reached.

According to the disclosed techniques, access nodes 17A may spray the packets of individual packet flows across the M paths end-to-end forming a virtual tunnel between a source access node and a destination access node. In this way, the number of layers included in switch fabric 14A or the number of hops along the M parallel data paths, might not matter for implementation of the packet spraying techniques described in this disclosure.

The technique of spraying packets of individual packet flows across all or a subset of the M parallel data paths of switch fabric 14A, however, enables the number of layers of network devices within switch fabric 14A to be reduced, e.g., to a bare minimum of one. Further, it enables fabric architectures in which the switches are not connected to each other, reducing the likelihood of failure dependence between two switches and thereby increasing the reliability of the switch fabric. Flattening switch fabric 14A may reduce cost by eliminating layers of network devices that require power and reduce latency by eliminating layers of network devices that perform packet switching. In one example, the flattened topology of switch fabric 14A may result in a core layer that includes only one level of spine switches, e.g., core switches 22, that might not communicate directly with one another but form a single hop along the M parallel data paths. In this example, any access node 17A sourcing traffic into switch fabric 14A may reach any other access node 17A by a single, one-hop L3 lookup by one of core switches 22.

An access node 17A sourcing a packet flow for a source server node 12A may use any technique for spraying the packets across the available parallel data paths, such as available bandwidth, random, round-robin, hash-based or other mechanism that may be designed to maximize, for example, utilization of bandwidth or otherwise avoid congestion. In some example implementations, flow-based load balancing need not necessarily be utilized and more effective bandwidth utilization may be used by allowing packets of a given packet flow (e.g., packets having the same source and destination or, for example, packets having the same five tuple) sourced by a server node 12A to traverse different paths of switch fabric 14A between access nodes 17A coupled to the source and destinations servers. The respective destination access node 17A associated with the destination server node 12A may be configured to reorder the variable length IP packets of the packet flows and deliver the packets to the destination server in the sequence in which they were sent.

In some example implementations, each access node 17A implements at least four different operational networking components or functions: (1) a source component operable to receive traffic from server node 12A, (2) a source switching component operable to switch source traffic to other source switching components of different access nodes 17A (possibly of different access node groups) or to core switches 22, (3) a destination switching component operable to switch inbound traffic received from other source switching components or from cores switches 22 and (4) a destination component operable to reorder packet flows and provide the packet flows to destination server nodes 12A.

In this example, server nodes 12A are connected to source components of the access nodes 17A to inject traffic into the switch fabric 14A, and server nodes 12A are similarly coupled to the destination components within the access nodes 17A to receive traffic therefrom. Because of the full-mesh, parallel data paths provided by switch fabric 14A, each source switching component and destination switching component within a given access node 17A need not perform L2/L3 switching. Instead, access nodes 17A may apply spraying algorithms to spray packets of a packet flow, e.g., based on available bandwidth, randomly, round-robin, quality of service (QOS)/scheduling or otherwise, to efficiently forward packets without requiring packet analysis and lookup operations.

Destination switching components of access nodes 17A may provide a limited lookup necessary only to select the proper output port for forwarding packets to local server nodes 12A. As such, with respect to full routing tables for the data center, only core switches 22 may need to perform full lookup operations. Thus, switch fabric 14A provides a highly-scalable, flat, high-speed interconnect in which server nodes 12A are, in some examples, effectively one L2/L3 hop from any other server node 12A within the data center.

Access nodes 17A may need to connect to a fair number of core switches 22 in order to communicate packet data to any other of access nodes 17A and the server nodes 12A accessible through those access nodes. In some cases, to provide a link multiplier effect, access nodes 17A may connect to core switches 22 via top of rack (TOR) Ethernet switches, electrical permutation devices, or optical permutation (OP) devices (not shown in FIG. 3). To provide an additional link multiplier effect, source components of the access nodes 17A may be configured to spray packets of individual packet flows of the traffic received from server node 12A across a set of the other access nodes 17A included in one or more access node groups 19A. In one example, access node 17A may achieve an 8× multiplier effect from inter-access node spraying, and an additional 8× multiplier effect from OP devices to connect to up to sixty-four core switches 22.

Flow-based routing and switching over Equal Cost Multi-Path (ECMP) paths through a network may be susceptible to highly variable load-dependent latency. For example, the network may include many small bandwidth flows and a few large bandwidth flows. In the case of routing and switching over ECMP paths, the source access node may select the same path for two of the large bandwidth flows leading to large latencies over that path. In order to avoid this issue and keep latency low across the network, an administrator may be forced to keep the utilization of the network below 25-30%, for example. The techniques described in this disclosure of configuring access nodes 17A to spray packets of individual packet flows across all available paths enables higher network utilization, e.g., 85-90%, while maintaining bounded or limited latencies. The packet spraying techniques enable a source access node 17A to fairly distribute packets of a given flow across all the available paths while taking link failures into account. In this way, regardless of the bandwidth size of the given flow, the load can be fairly spread across the available paths through the network to avoid over utilization of a particular path. The disclosed techniques enable the same amount of networking devices to pass three times the amount of data traffic through the network while maintaining low latency characteristics and reducing a number of layers of network devices that consume energy. In some examples, access nodes 17A may share information about failed data paths, thereby enabling a source access node to use such information to prevent packet loss resulting from spraying packets over failed data paths. Accordingly, and as further described herein, the packet spraying techniques described herein may include limiting the paths over which packets are sprayed.

As shown in the example of FIG. 3, in some example implementations, access nodes 17A may be arranged into multiple different access node groups $19A_1$-$19A_Y$ (ANGs in FIG. 3), each including any number of access nodes 17A up to, for example, x access nodes $17A_1$-$17A_x$. As such, multiple access nodes 17A may be grouped and arranged (e.g., within a single electronic device or network appliance), referred to herein as an access node group (ANG) 19A, for providing services to a group of servers supported by the set of access nodes internal to the device.

As described, each access node group 19A may be configured as standalone network device, and may be implemented as a device configured for installation within a compute rack, a storage rack or a converged rack. In general, each access node group 19A may be configured to operate as a high-performance I/O hub designed to aggregate and process network and/or storage I/O for multiple server nodes 12A. As described above, the set of access nodes 17A within each of the access node groups 19A provide highly-programmable, specialized I/O processing circuits for handling networking and communications operations on behalf of server nodes 12A. In addition, in some examples, each of access node groups 19A may include storage devices 41A, such as high-speed solid-state hard drives, configured to provide network accessible storage for use by applications executing on the servers. Each access node group 19A including its set of access nodes 17A, storage devices 41A, and the set of server nodes 12A supported by the access nodes 17A of that access node group may be referred to herein as a network storage compute unit (NSCU) 40A.

In FIG. 3, and in accordance with one or more aspects of the present disclosure, server node 12A-1 within NCSU 40-1 may write data to server node 12A-33 within NCSU 40-3. For instance, in the example of FIG. 3, server node 12A-1 outputs data to access node 17A-1. Access node 17A-1 sprays data across multiple paths within switch fabric 14A to access node 17A-9. Access node 17A-9 receives the data and stores the data in high speed memory included within access node 17A-9 (not shown in FIG. 3), and then outputs an acknowledgment destined for access node 17A-1 before the data is stored at server node 12A-33 within NCSU 40-3. In some examples, to output the acknowledgment, access node 17A-1 may spray packets over multiple paths within switch fabric 14A to access node 17A-1. Access node 17A-1 detects a signal over switch fabric 14A and determines that the signal corresponds to an acknowledgment that the data can be assumed to have been stored successfully at server node 12A-33.

After outputting the acknowledgment to server node 12A-1, access node 17-9 may complete the process of storing the data at server node 12A-33. For instance, in the example of FIG. 3, access node 17A-9 outputs the data to server node 12A-33. Server node 12A-33 stores the data within local disk storage associated within server node 12A-33.

Figure 4:
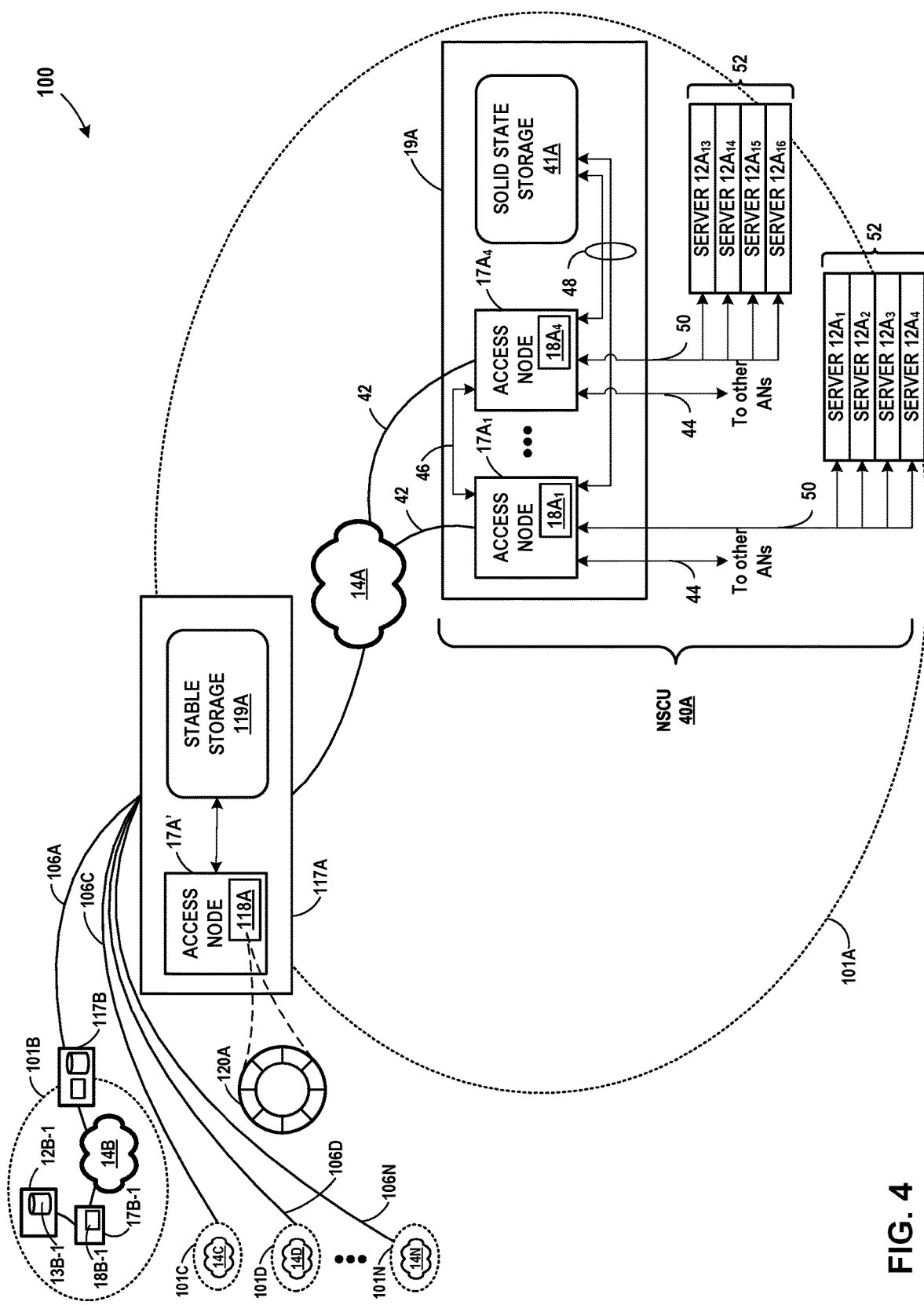
FIG. 4 is a block diagram illustrating a more detailed illustration of components within an example data center, in accordance with one or more aspects of the present disclosure.

FIG. 4 is a block diagram illustrating an example system 100 including a more detailed illustration of components within an example data center, in accordance with one or more aspects of the present disclosure. FIG. 4 is similar to FIG. 1, and includes data center 101A and data center 101B connected by link 106A, along with data centers 101C, 101D, through 101N (collectively "data centers 101," representing any number of data centers) connected through various links, including link 106C, link 106D, and link 106N. Gateway 117A serves as an edge gateway connecting data center 101A to data centers 101B, 101C, 101D, through 101N. Similarly gateway 117B serves as an edge gateway connecting data center 101B to other data centers 101 via corresponding links (links not shown).

In FIG. 4, data center 101A includes an example of network storage compute unit (NSCU) 40A including an access node group 19A and its supported servers 52. Access node group 19A may be configured to operate as a high-performance I/O hub designed to aggregate and process network and storage I/O to multiple servers 52. In the particular example of FIG. 4, access node group 19A includes four access nodes $17A_1$-$17A_4$ (collectively, "access nodes 17A") connected to a pool of local solid state storage 41A. In some examples, access node group 19A may support a total of sixteen server nodes $12_1$-$12_{16}$ (collectively, "server nodes 12") with each of the four access nodes 17A within access node group 19A supporting four of server nodes 12. In some examples, each of the four server nodes 12 supported by each of the access nodes 17A may be arranged as a server 52. In some examples, the server nodes 12 described throughout this application may be dual-socket or dual-processor "server nodes" that are arranged in groups of two or more within a standalone server device, e.g., server 52.

Although access node group 19A is illustrated in FIG. 4 as including four access nodes 17A that are all connected to a single pool of solid state storage 41A, an access node group may be arranged in other ways. In one example, each of the four access nodes 17A may be included on an individual access node sled that also includes solid state storage and/or other types of storage for the access node. In this example, an access node group may include four access node sleds each having an access node and a set of local storage devices.

In one example implementation, access nodes 17A within access node group 19A connect to servers 52 and solid state storage 41A using Peripheral Component Interconnect express (PCIe) links 48, 50, and connect to other access nodes and the datacenter switch fabric 14 using Ethernet links 42, 44, 46. For example, each of access nodes 17A may support six high-speed Ethernet connections, including two externally-available Ethernet connections 42 for communicating with the switch fabric, one externally-available Ethernet connection 44 for communicating with other access nodes in other access node groups, and three internal Ethernet connections 46 for communicating with other access nodes 17A in the same access node group 19A. In one example, each of externally-available connections 42 may be a 100 Gigabit Ethernet (GE) connection. In this example, access node group 19A has 8×100 GE externally-available ports to connect to the switch fabric 14.

Within access node group 19A, connections 42 may be copper, i.e., electrical, links arranged as 8×25 GE links between each of access nodes 17A and optical ports of access node group 19A. Between access node group 19A and the switch fabric, connections 42 may be optical Ethernet connections coupled to the optical ports of access node group 19A. The optical Ethernet connections may connect to one or more optical devices within the switch fabric, e.g., optical permutation devices described in more detail below. The optical Ethernet connections may support more bandwidth than electrical connections without increasing the number of cables in the switch fabric. For example, each optical cable coupled to access node group 19A may carry 4×100 GE optical fibers with each fiber carrying optical signals at four different wavelengths or lambdas. In other examples, the externally-available connections 42 may remain as electrical Ethernet connections to the switch fabric.

The remaining Ethernet connections supported by each of access nodes 17A include one Ethernet connection 44 for communication with other access nodes within other access node groups, and three Ethernet connections 46 for communication with the other three access nodes within the same access node group 19A. In some examples, connections 44 may be referred to as "inter-access node group links" and connections 46 may be referred to as "intra-access node group links."

Ethernet connections 44, 46 provide full-mesh connectivity between access nodes within a given structural unit. In one example, such a structural unit may be referred to herein as a logical rack (e.g., a half-rack or a half physical rack) that includes two NSCUs 40 having two AGNs 19A and supports an 8-way mesh of eight access nodes 17A for those AGNs (see, e.g., FIG. 6). In this particular example, connections 46 would provide full-mesh connectivity between the four access nodes 17A within the same access node group 19A, and connections 44 would provide full-mesh connectivity between each of access nodes 17A and four other access nodes within one other access node group of the logical rack (i.e., structural unit). In addition, access node group 19A may have enough, e.g., sixteen, externally-available Ethernet ports to connect to the four access nodes in the other access node group.

In the case of an 8-way mesh of access nodes, i.e., a logical rack of two NSCUs 40, each of access nodes 17A may be connected to each of the other seven access nodes by a 50 GE connection. For example, each of connections 46 between the four access nodes 17A within the same access node group 19A may be a 50 GE connection arranged as 2×25 GE links. Each of connections 44 between the four access nodes 17A and the four access nodes in the other access node group may include four 50 GE links. In some examples, each of the four 50 GE links may be arranged as 2×25 GE links such that each of connections 44 includes 8×25 GE links to the other access nodes in the other access node group. This example is described in more detail below with respect to FIG. 5.

In another example, Ethernet connections 44, 46 provide full-mesh connectivity between access nodes within a given structural unit that is a full-rack or a full physical rack that includes four NSCUs 40 having four AGNs 19A and supports a 16-way mesh of access nodes 17A for those AGNs. In this example, connections 46 provide full-mesh connectivity between the four access nodes 17A within the same access node group 19A, and connections 44 provide full-mesh connectivity between each of access nodes 17A and twelve other access nodes within three other access node group. In addition, access node group 19A may have enough, e.g., forty-eight, externally-available Ethernet ports to connect to the four access nodes in the other access node group.

In the case of a 16-way mesh of access nodes, each of access nodes 17A may be connected to each of the other fifteen access nodes by a 25 GE connection, for example. In other words, in this example, each of connections 46 between the four access nodes 17A within the same access node group 19A may be a single 25 GE link. Each of connections 44 between the four access nodes 17A and the twelve other access nodes in the three other access node groups may include 12×25 GE links.

As shown in FIG. 4, each of access nodes 17A within an access node group 19A may also support a set of high-speed PCIe connections 48, 50, e.g., PCIe Gen 3.0 or PCIe Gen 4.0 connections, for communication with solid state storage 41A within access node group 19A and communication with servers 52 within NSCU 40. Each of servers 52 includes four server nodes 12 supported by one of access nodes 17A within access node group 19A. Solid state storage 41A may be a pool of Non-Volatile Memory express (NVMe)-based solid state drive (SSD) storage devices accessible by each of access nodes 17A via connections 48.

In one example, solid state storage 41A may include twenty-four SSD devices with six SSD devices for each of access nodes 17A. The twenty-four SSD devices may be arranged in four rows of six SSD devices with each row of SSD devices being connected to one of access nodes 17A. Each of the SSD devices may provide up to 16 Terabytes (TB) of storage for a total of 384 TB per access node group 19A. As described in more detail below, in some cases, a physical rack may include four access node groups 19A and their supported servers 52. In that case, a typical physical rack may support approximately 1.5 Petabytes (PB) of local solid state storage. In another example, solid state storage 41A may include up to 32 U.2×4 SSD devices. In other examples, NSCU 40 may support other SSD devices, e.g., 2.5" Serial ATA (SATA) SSDs, mini-SATA (mSATA) SSDs, M.2 SSDs, and the like. In some examples solid state storage 41A may be used as stable storage by access nodes 17A in the same manner in which gateways 117 use stable storage devices 119, as described in connection with FIG. 1. In other words, access nodes 17A may use solid state storage to ensure the integrity of data stored within access nodes 17A during exceptional circumstances (e.g., power outages or connectivity loss).

In the above described example in which each of the access nodes 17A is included on an individual access node sled with local storage for the access node, each of the access node sleds may include four SSD devices and some additional storage that may be hard drive or solid state drive devices. In this example, the four SSD devices and the additional storage may provide approximately the same amount of storage per access node as the six SSD devices described in the previous example.

In one example, each of access nodes 17A supports a total of 96 PCIe lanes. In this example, each of connections 48 may be an 8×4-lane PCI Gen 3.0 connection via which each of access nodes 17A may communicate with up to eight SSD devices within solid state storage 41A. In addition, each of connections 50 between a given access node 17A and the four server nodes 12 within the server 52 supported by the access node 17A may be a 4×16-lane PCIe Gen 3.0 connection. In this example, access node group 19A has a total of 256 external facing PCIe links that interface with servers 52. In some scenarios, access nodes 17A may support redundant server connectivity such that each of access nodes 17A connects to eight server nodes 12 within two different servers 52 using an 8×8-lane PCIe Gen 3.0 connection.

In another example, each of access nodes 17A supports a total of 64 PCIe lanes. In this example, each of connections 48 may be an 8×4-lane PCI Gen 3.0 connection via which each of access nodes 17A may communicate with up to eight SSD devices within solid state storage 41A. In addition, each of connections 50 between a given access node 17A and the four server nodes 12 within the server 52 supported by the access node 17A may be a 4×8-lane PCIe Gen 4.0 connection. In this example, access node group 19A has a total of 128 external facing PCIe links that interface with servers 52.

In the example illustrated in FIG. 4, gateway 117A includes access node 17A' and stable storage 119A. Access node 17A' of gateway 117A may be implemented in the same manner as one or more of access nodes 17A described above in connection with NCSU 40A and access node group 19A. In the example of FIG. 4, access node 17A' of gateway 117A includes memory 118A, which may correspond to memory 118A illustrated in FIG. 1 and FIG. 2. In some examples, memory 118A may include or be configured to include storage suitable for implementing various data structures, including ring buffer 120A. Stable storage 119A (which may correspond to stable storage 119A of FIG. 1 and FIG. 2) may be implemented as solid state storage or other storage resistant to power failures, and thus may be implemented in a manner consistent with or the same as solid state storage 41A of access node group 19A.

Gateway 117B is shown as a gateway device for data center 101B, and may be implemented in a manner similar to gateway 117A, as described in FIG. 1 and FIG. 2. Further, switch fabric 14B, access node 17B-1, and server node 12B-1 may be implemented in a manner consistent with like-numbered elements of FIG. 1 and FIG. 2. Data centers 101C through 101N may be configured similarly, with corresponding gateways 117 and server nodes 12 connected through switch fabrics 14.

In FIG. 4, and in accordance with one or more aspects of the present disclosure, server node 12A-1 may initiate a data write operation to a destination outside data center 101A. For instance, in an example that can be described with reference to FIG. 4, server node 12A-1 outputs a signal over link 50. Access node 17A-1 detects a signal and determines that the signal includes data to be stored at server node 12B-1. Access node 17A-1 outputs the data over switch fabric 14A. Gateway 117A detects a signal over switch fabric 14A and determines that the signal includes data intended for one or more storage devices located outside of data center 101A.

Gateway 117A may store the data across multiple data centers 101. For instance, in the example of FIG. 4, gateway 117A stores the data received over switch fabric 14A within ring buffer 120A of memory 118A. Gateway 117A (e.g., access node 17A') splits the data into a plurality of segments, and also generates a plurality of parity segments, pursuant to an erasure coding algorithm. Gateway 117A outputs the segments over links 106. Specifically, gateway 117A outputs one or more data or parity segments over link 106A to gateway 117B of data center 101B, and gateway 117A outputs one or more data or parity segments over link 106C to gateway 117C. In general, gateway 117A may further output one or more data or parity segments over other links 106 (e.g., link 106N) to other gateways 117 within data centers 101 (e.g., gateway 117N within data center 101N). Should a relatively minor infrastructure failure occur before the data is transferred and/or acknowledged (e.g., if power to data center 101A is lost), gateway 117A stores data within stable storage 119A, and resumes transmission of the data and parity segments over links 106 when the infrastructure failure is resolved.

Gateway 117A may output an early acknowledgment to server node 12A-1. For instance, after gateway 117A outputs the last of the data and parity segments over links 106 in FIG. 4, gateway 117A outputs an acknowledgment over switch fabric 14A, which may occur before the data is actually stored at the intended storage device located outside of data center 101A. Access node 17A-1 receives a signal over switch fabric 14A and outputs an indication of the signal to server node 12A-1. Server node 12A-1 receives the indication of the signal and determines that the signal corresponds to acknowledgement that the data can be assumed to have been stored successfully at server node 12B-1 within data center 101B. Once server node 12A-1 receives the acknowledgment, server node 12A-1 may be free to initiate another write operation within system 100 and interact with systems and/or devices outside data center 101A as if the data has been stored at its destination at data center 101B.

In some examples, ring buffer 120A is implemented as a data structure within memory 118A using a single fixed size buffer as if it were connected end-to-end. A first-in-first-out buffering scheme may be used to efficiently process data streams, since sequential data elements within a ring buffer do not need to be moved within the buffer as data is processed.

After outputting the acknowledgement over switch fabric 14A, gateway 117A passes responsibility to gateway 117B (or other gateways 117) for storing the data at server node 12B-1. For instance, still referring to FIG. 4, gateway 117A receives an acknowledgment over link 106A from gateway 117B. Similarly, gateway 117A receives an acknowledgement from each of gateways 117 within other data centers 101 that were sent a data or parity segment by gateway 117A. Once gateway 117A receives all of the acknowledgments, gateway 117A increments a pointer associated with ring buffer 120A, thereby allocating space for additional data to be written to the ring buffer from one or more access nodes 17A within data center 101A. If ring buffer 120A becomes full, gateway 117A might refrain from issuing any further acknowledgements for write operations originating from within data center 101A until a minimum amount of space is freed in ring buffer 120A in response to receipt of acknowledgements from gateway 117B or other gateway devices of other data centers. In some examples, gateway 117A may write data to stable storage 119A when ring buffer 120A approaches full capacity, since such a condition may be a sign of an infrastructure failure or connectivity loss. Further, in some examples, ring buffer 120A may serve as a common buffer for multiple threads and/or multiple flows of data passing through gateway 117A from multiple sources (e.g., multiple server nodes 12A). The acknowledgments sent by each of gateways 117 (as well as other acknowledgments described herein) may identify a particular flow and/or sequence number associated with that flow.

If gateway 117A does not receive a timely acknowledgment from each of the expected gateways 117, gateway 117A may attempt to retransmit the data until timely acknowledgments are received. Since each of links 106 is a direct link, congestion is unlikely, and if sufficient error-correcting codes are used during transmission by gateway 117A, bit errors are also unlikely.

However, if one or more of links 106 lose connectivity (e.g., a cut cable) while gateway 117A is transmitting data to other gateways 117, gateway 117A might attempt to retransmit the data and parity segments to other data centers 101 over links 106 excluding the cut link 106. Alternatively, or in addition, in the event of one or more links 106 being cut, server node 12B-1 may reconstruct the data from the data and parity segments that were successfully transmitted by gateway 117A to other gateways 117. Further, if gateway 117A fails before gateway 117A receives timely acknowledgments, then in that event, server node 12B-1 may also reconstruct the data from the data and parity segments that were successfully transmitted by gateway 117A to other gateways 117. In each failure mode, it is likely that a sufficient number of data and/or parity segments will be received by other gateways 117 to enable server node 12B-1 to reconstruct the original data. Still further, even in a failure mode in which data center 101A experiences a catastrophic failure that affects gateway 117A, it is likely that a sufficient number of data and/or parity segments will be received by other gateways 117 to enable server node 12B-1 to reconstruct the original data. Accordingly, the early acknowledgment procedure described herein will very likely avoid failure modes in which erroneous acknowledgments have been issued as long as gateway 117A refrains from outputting an acknowledgment to the source device within data center 101A until each of the data and parity segments are placed on links 106.

In an example where gateway 117A has successfully performed the transfer to gateway 117B, gateway 117B completes the process of storing the data at server node 12B-1. For instance, still referring to FIG. 4, gateway 117B outputs the data over switch fabric 14B. Access node 17B-1 receives the data over switch fabric 14B. Access node 17B-1 stores the data in memory 18B-1 and then outputs an acknowledgment over switch fabric 14B. Gateway 117B receives a signal over switch fabric 14B that it determines corresponds to an acknowledgment that the data can be assumed to have been stored at server node 12B-1. In some examples, gateway 117B may include a ring buffer (not shown) that may operate in a manner similar to ring buffer 120A of gateway 117A. In such an example, gateway 117B may, upon receiving the acknowledgment, increment a pointer associated with such a ring buffer, and thereby allocate space for additional data received from data center 101A or elsewhere. Access node 17B-1 thereafter outputs the data to server node 12B-1, and server node 12B-1 stores the data within storage device 13B-1.

Figure 5:
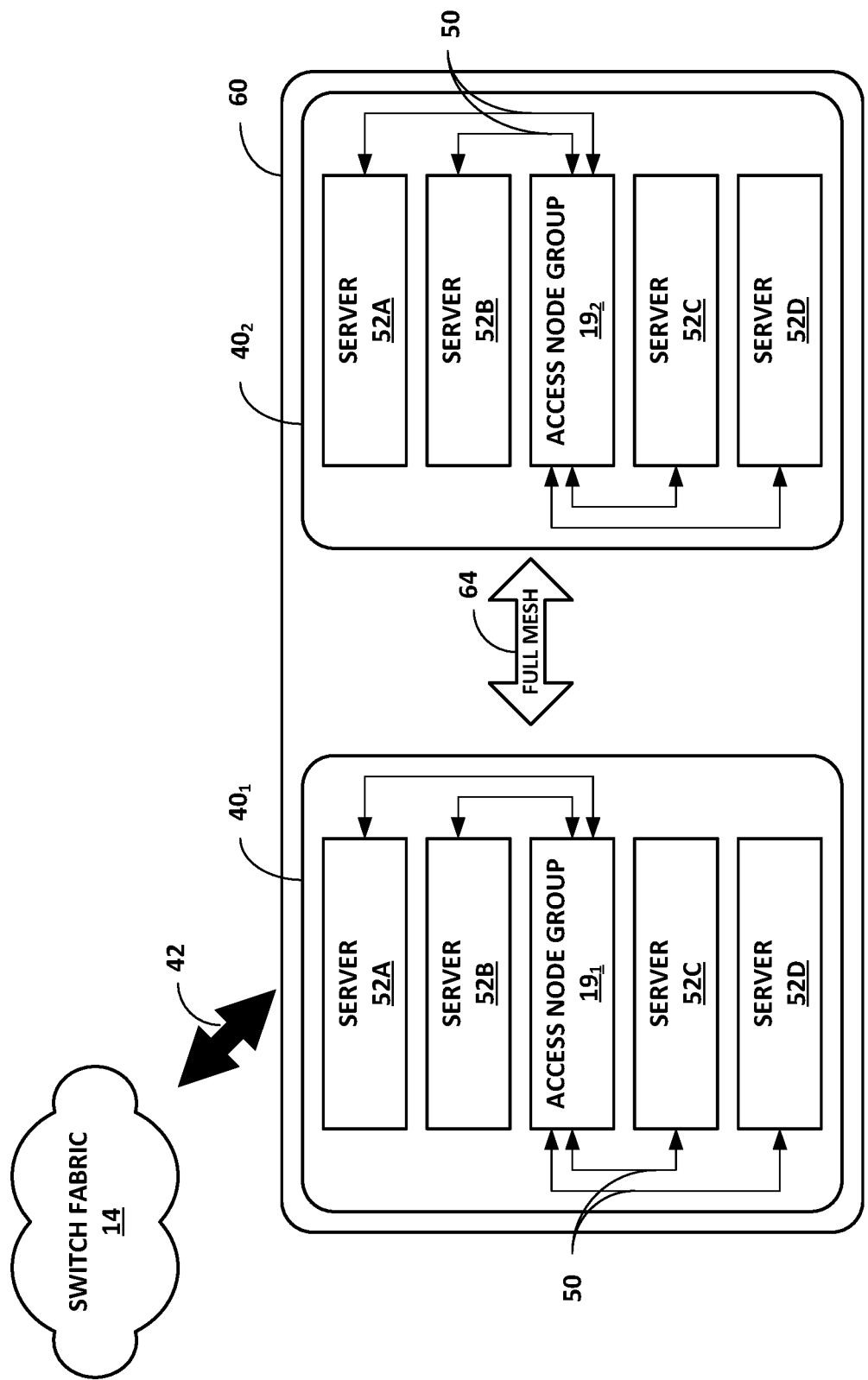
FIG. 5 is a block diagram illustrating an example logical rack arrangement including two example NSCUs, in accordance with one or more aspects of the present disclosure.

FIG. 5 is a block diagram illustrating an example logical rack arrangement including two example NSCUs, in accordance with one or more aspects of the present disclosure. In the example of FIG. 5, logical rack 60 includes NSCUs 401 and 402, each of which may be implemented in the manner corresponding to NCSU 40A of FIG. 4. In some examples, each of NSCUs 40 may be referred to as a "compute sandwich" based on the structural arrangement of access node group 19 "sandwiched" between two servers 52 on the top and two servers 52 on the bottom. For example, server 52A may be referred to as a top second server, server 52B may be referred to as a top server, server 52C may be referred to as a bottom server, and server 52D may be referred to as a bottom second server. Each of servers 52 may include four server nodes, and each server node may be a dual-socket or dual-processor server sled.

In FIG. 5, each of access node groups 19 connects to servers 52 using PCIe links 50, and to switch fabric 14 using Ethernet links 42. Access node groups $19_1$ and $19_2$ may each include four access nodes connected to each other using Ethernet links and local solid state storage connected to the access nodes using PCIe links as described above in FIG. 4. The access nodes within access node groups $19_1$ and $19_2$ are connected to each other in a full mesh 64, which is described in more detail with respect to FIG. 6.

In addition, each of access node groups 19 supports PCIe connections 50 to servers 52. In one example, each of connections 50 may be a 4×16-lane PCIe Gen 3.0 connection such that access node group 19 has a total of 256 externally-available PCIe links that interface with servers 52. In another example, each of connections 50 may be a 4×8-lane PCIe Gen 4.0 connection for communication between access nodes within access node group 19 and server nodes within servers 52. In either example, connections 50 may provide a raw throughput of 512 Gigabits per access node 19 or approximately 128 Gigabits of bandwidth per server node without accounting for any overhead bandwidth costs.

As discussed above with respect to FIG. 4, each of NSCUs 40 supports 8×100 GE links 42 from access node group 19 to switch fabric 14. Each of NSCUs 40 thus provides support for up to sixteen server nodes in four servers 52, local solid state storage, and 800 Gbps of full duplex (i.e., bidirectional) network bandwidth. Each of access node groups 19 may, therefore, provide true hyper-convergence of compute, storage, networking and security of servers 52. Logical rack 60, including two NSCUs 40, therefore, provides support for up to thirty-two server nodes in eight servers 52, local solid state storage at access node groups 19, and 16×100 GE links 42 to switch fabric 14, which results in 1.6 Terabits per second (Tbps) of full duplex network bandwidth.

As described herein, one or more of servers 52 within NCSU 40-1 may write data to one or more servers 52 of NCSU 40-2 over full mesh 64, and one or more access nodes 17 included within each access node group 19 involved in the data write operation (e.g., see FIG. 4) may provide an early acknowledgment to the source device. In some examples, the early acknowledgment may, in accordance with one or more aspects of the present disclosure, result in increased throughput for a series of data write operations initiated by one of servers 52 (or a server node 12 within one of servers 52).

Figure 6:
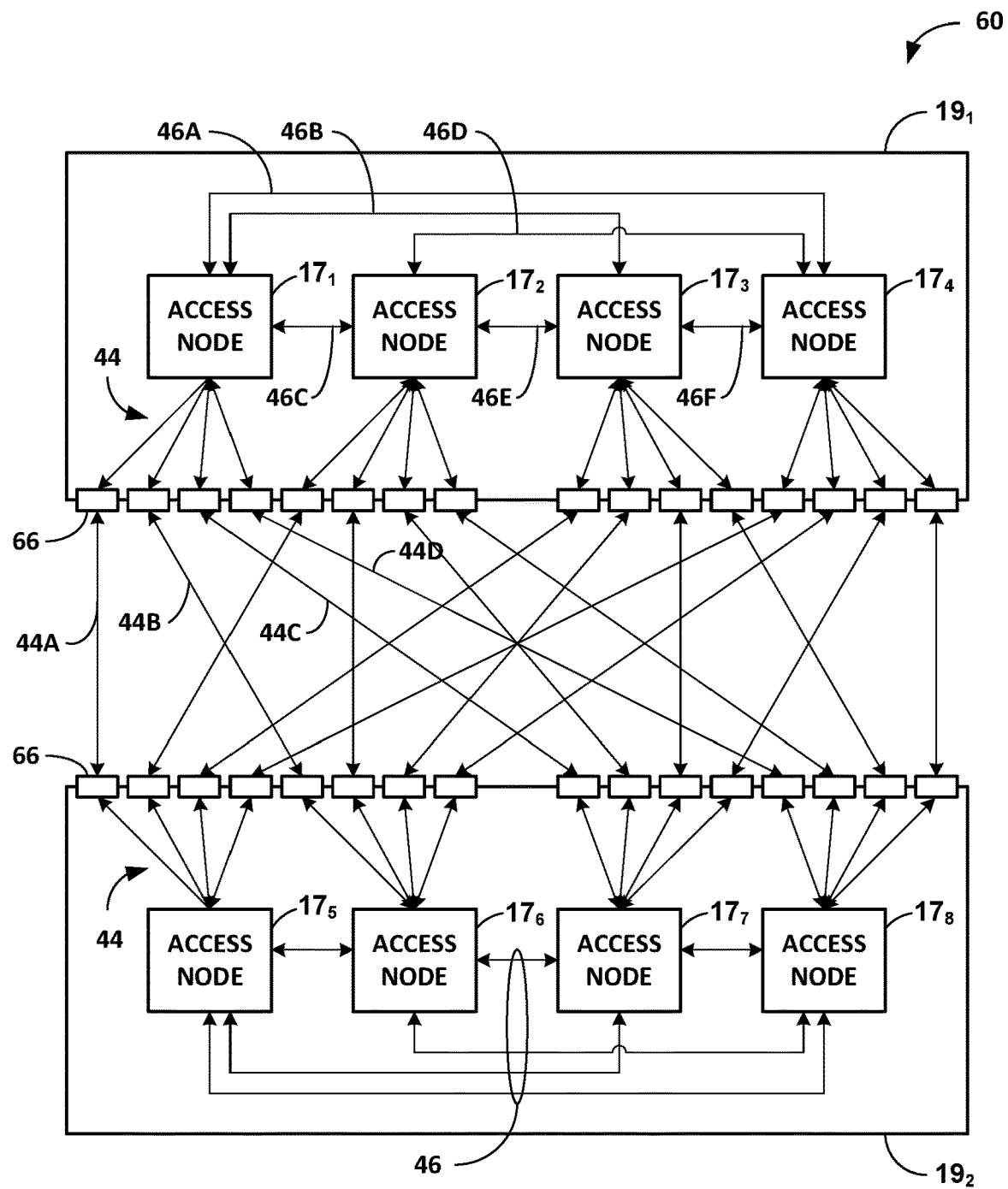
FIG. 6 is a block diagram illustrating an example of full mesh connectivity between two access node groups within an example logical rack, in accordance with one or more aspects of the present disclosure.

FIG. 6 is a block diagram illustrating an example of full mesh connectivity between two access node groups within an example logical rack, in accordance with one or more aspects of the present disclosure. FIG. 6 illustrates logical rack 60, which includes access node group $19_1$ and access node group $19_2$. Access node group $19_1$ includes four access nodes $17_1$-$17_4$ and access node group $19_2$ includes four access nodes $17_5$-$17_8$. Each of access nodes 17 connects to the other access nodes within the logical rack in a mesh fabric topology. The eight access nodes 17 included in the mesh topology may be referred to as an access node "cluster." In this way, each of access nodes 17 is able to spray incoming packets to each of the other access nodes in the cluster.

In the illustrated configuration of an 8-way mesh interconnecting two access node groups 19, each access node 17 connects via full mesh connectivity to each of the other seven access nodes in the cluster. The mesh topology between access nodes 17 includes intra-access node group links 46 between the four access nodes included in the same access node group 19, and inter-access node group links 44 between access nodes $17_1$-$17_4$ in access node group $19_1$ and access nodes $17_5$-$17_8$ in access node group $19_2$. Although illustrated as a single connection between each of access nodes 17, each of connections 44, 46 are bidirectional such that each access node connects to each other access node in the cluster via a separate link.

Each of access nodes $17_1$-$17_4$ within first access node group $19_1$ has three intra-access node group connections 46 to the other access nodes in first access node group $19_1$. As illustrated in first access node group $19_1$, access node $17_1$ supports connection 46A to access node $17_4$, connection 46B to access node $17_3$, and connection 46C to access node $17_2$. Access node $17_2$ supports connection 46A to access node $17_1$, connection 46D to access node $17_4$, and connection 46E to access node $17_3$. Access node $17_3$ supports connection 46B to access node $17_1$, connection 46E to access node $17_2$, and connection 46F to access node $17_4$. Access node $17_4$ supports connection 46A to access node $17_1$, connection 46D to access node $17_2$, and connection 46F to access node $17_3$. The access nodes $17_5$-$17_8$ are similarly connected within second access node group $19_2$.

Each of access nodes $17_1$-$17_4$ within first access node group $19_1$ also has four inter-access node group connections 44 to the access nodes $17_5$-$17_8$ in second access node group $19_2$. As illustrated in FIG. 5, first access node group $19_1$ and second access node group $19_2$ each has sixteen externally-available ports 66 to connect to each other. For example, access node $17_1$ supports connections 44A, 44B, 44C, and 44D through four external facing ports 66 of first access node group $19_1$ to four externally-available ports 66 of second access node group $19_2$ to reach access nodes $17_5$-$17_8$. Specifically, access node $17_1$ supports connection 44A to access node $17_5$ within second access node group $19_2$, connection 44B to access node $17_6$ within second access node group $19_2$, connection 44C to access node $17_7$ within second access node group $19_2$, and connection 44D to access node $17_8$ within second access node group $19_2$. The remaining access nodes $17_2$-$17_4$ within first access node group $19_1$ are similarly connected to access nodes $17_5$-$17_8$ within second access node group $19_2$. In addition, in the reverse direction, the access nodes $17_5$-$17_8$ are similarly connected to access nodes $17_1$-$17_4$ within first access node group $19_1$.

Each of access nodes 17 may be configured to support up to 400 Gigabits of bandwidth to connect to other access nodes in the cluster. In the illustrated example, each of access nodes 17 may support up to eight 50 GE links to the other access nodes. In this example, since each of access nodes 17 only connects to seven other access nodes, 50 Gigabits of bandwidth may be leftover and used for managing the access node. In some examples, each of connections 44, 46 may be single 50 GE connections. In other examples, each of connections 44, 46 may be 2×25 GE connections. In still other examples, each of intra-access node group connections 46 may be 2×25 GE connections, and each of inter-access node group connections 44 may be single 50 GE connections to reduce a number of inter-box cables. For example, from each access node $17_1$-$17_4$ within first access node group $19_1$, 4×50 GE links go off box to connect to access nodes $17_5$-$17_8$ in second access node group $19_2$. In some examples, the 4×50 GE links may be taken out from each of the access nodes 17 using DAC cables.

As described herein, one or more access nodes 17 within each of access node groups 19 may perform a data write operation to devices (e.g., server nodes 12) connected to other access nodes 17 within FIG. 6. Each of access nodes 17 connected to the destination device may output an early acknowledgment to the source access node 17, thereby enabling the source access node to initiate another write operation in a series of write operations. In some examples, the early acknowledgment procedures described herein may enable one or more source devices connected to one or more of access nodes 17 to perform write operations within logical rack 60 at a high rate.

Figure 7:
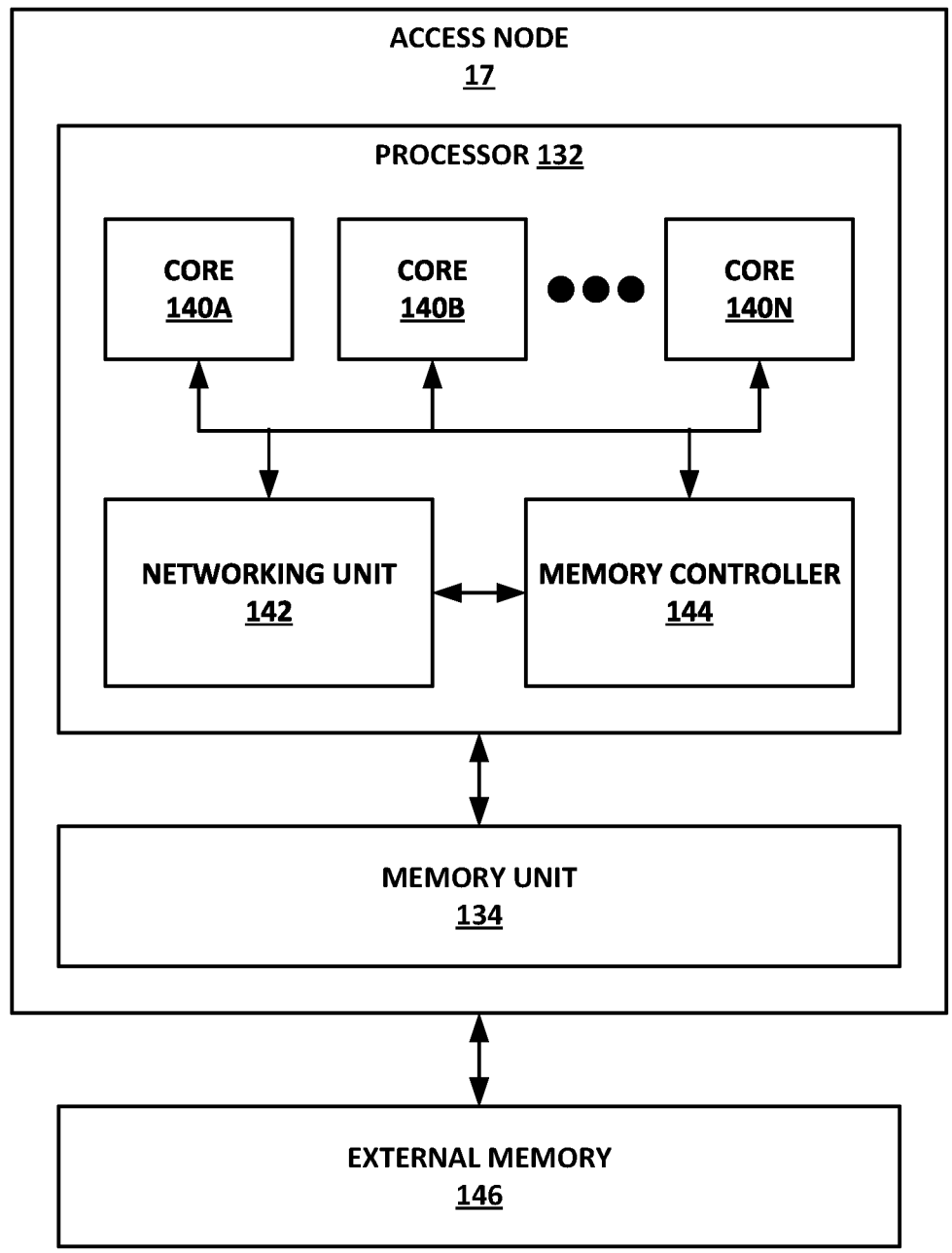
FIG. 7 is a block diagram illustrating an example access node including a networking unit and two or more processing cores, in accordance with one or more aspects of the present disclosure.

FIG. 7 is a block diagram illustrating an example access node 17 including a networking unit 142 and two or more processing cores 140A-140N (collectively "cores 140"). Access node 17 generally represents a hardware chip implemented in digital logic circuitry. In various examples, access node 17 may be provided as an integrated circuit mounted on a motherboard of a computing device or installed on a card connected to the motherboard of the computing device via PCIe, or the like. In some examples, access node 17 may be an integrated circuit within an access node group (e.g., one of access node groups 19) configured as a standalone network device for installation within a compute rack, a storage rack, or a converged rack.

Access node 17 may operate substantially similar to any of the access nodes 17 illustrated in other Figures herein. Thus, access node 17 may be communicatively coupled to a data center fabric (e.g., switch fabric 14), one or more server devices (e.g., server nodes 12 or servers 52), storage media (e.g., solid state storage 41 of FIG. 3), one or more network devices, random access memory, or the like, e.g., via PCIe, Ethernet (wired or wireless), or other such communication media in order to interconnect each of these various elements.

In the illustrated example of FIG. 7, access node 17 includes a multi-core processor 132 having a plurality of cores 140 coupled to an on-chip memory unit 134. In some examples, memory unit 134 may include a cache memory. In other examples, memory unit 134 may include two types of memory or memory devices, namely coherent cache memory and non-coherent buffer memory. Processor 132 includes a plurality of cores 140. In some examples, processor 132 may include at least two processing cores. In one specific example, processor 132 may include six processing cores 140. Processor 132 also includes a networking unit 142 and a memory controller 144. As illustrated in FIG. 7, each of cores 140, networking unit 142, memory controller 144 and memory unit 134 are communicatively coupled to each other. In addition, access node 17 is coupled to an off-chip external memory 146. External memory 146 may comprise random access memory (RAM) or dynamic random access memory (DRAM).

Memory unit 134 may be or may include one or more memory devices 18 as illustrated in FIG. 1, FIG. 2, and FIG. 4 of this disclosure. In some examples, such memory devices 18 may be included within buffer memory of memory unit 134, and may be implemented as high bandwidth memory or other high speed memory suitable for implementation of the systems, examples, and procedures described herein. Memory unit 134 may be used for storage of a ring buffer data structure, such as ring buffer 120A as described in connection with FIG. 4. In examples where access node 17 is included within one or more gateways 117, as illustrated in FIG. 4, access node 17 may further include, or have access to, one or more stable storage devices 119. Further, in some examples, access node 17 may send early acknowledgments during write operations in accordance with one or more aspects of the present disclosure.

In this example, access node 17 represents a high performance, hyper-converged network, storage, and data processor and input/output hub. Cores 140 may comprise one or more of microprocessor without interlocked pipeline stages (MIPS) cores, advanced reduced instruction set computing (RISC) machine (ARM) cores, performance optimization with enhanced RISC—performance computing (PowerPC) cores, RISC five (RISC-V) cores, or complex instruction set computing (CISC or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

In some examples, the plurality of cores 140 may be capable of processing a plurality of events related to each data packet of one or more data packets, received by networking unit 142, in a sequential manner using one or more work units. In general, work units are sets of data exchanged between cores 140 and networking unit 142 where each work unit may represent one or more of the events related to a given data packet. In some examples, in processing the plurality of events related to each data packet, a first one of the plurality of cores 140, e.g., core 140A, may process a first event of the plurality of events. Moreover, first core 140A may provide to a second one of plurality of cores 140, e.g., core 140B, a first work unit of the one or more work units. Furthermore, second core 140B may process a second event of the plurality of events in response to receiving the first work unit from first core 140B.

Access node 17 may act as a combination of a switch/router and a number of network interface cards. Networking unit 142 includes a forwarding pipeline implemented using flexible engines (e.g., a parser engine, a look-up engine, and a rewrite engine) and supports features of IP transit switching. For example, networking unit 142 may be configured to receive one or more data packets from and transmit one or more data packets to one or more external devices, e.g., network devices. Networking unit 142 may use processing cores to perform network interface card (NIC) functionality, packet switching, and the like, and may use large forwarding tables and offer programmability. Networking unit 142 may include one or more hardware direct memory access (DMA) engine instances (not shown) configured to fetch packet data for transmission. The packet data may be in buffer memory of on-chip memory unit 134 or off-chip external memory 146, or in host memory.

Networking unit 142 may expose Ethernet ports for connectivity to a network, such as switch fabric 14 of FIG. 1. In this way, access node 17 supports one or more high-speed network interfaces, e.g., Ethernet ports, without the need for a separate network interface card (NIC). Although not illustrated in FIG. 7, access node 17 may include one or more interfaces for connectivity to host devices (e.g., servers) and data storage devices, e.g., solid state drives (SSDs) via PCIe lanes. Access node 17 may also include one or more high bandwidth interfaces for connectivity to off-chip external memory 146.

In some examples, processor 132 may further include one or more accelerators (not shown) configured to perform acceleration for various data-processing functions, such as look-ups, matrix multiplication, cryptography, compression, regular expressions, or the like. For example, the accelerators may comprise hardware implementations of look-up engines, matrix multipliers, cryptographic engines, compression engines, regular expression interpreters, or the like.

Memory controller 144 may control access to on-chip memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to a cache memory or a buffer memory of memory unit 134. In some examples, memory controller 144 may map the accesses based on one or more of an address range, an instruction or an operation code within the instruction, a special access, or a combination thereof.

Figure 8:
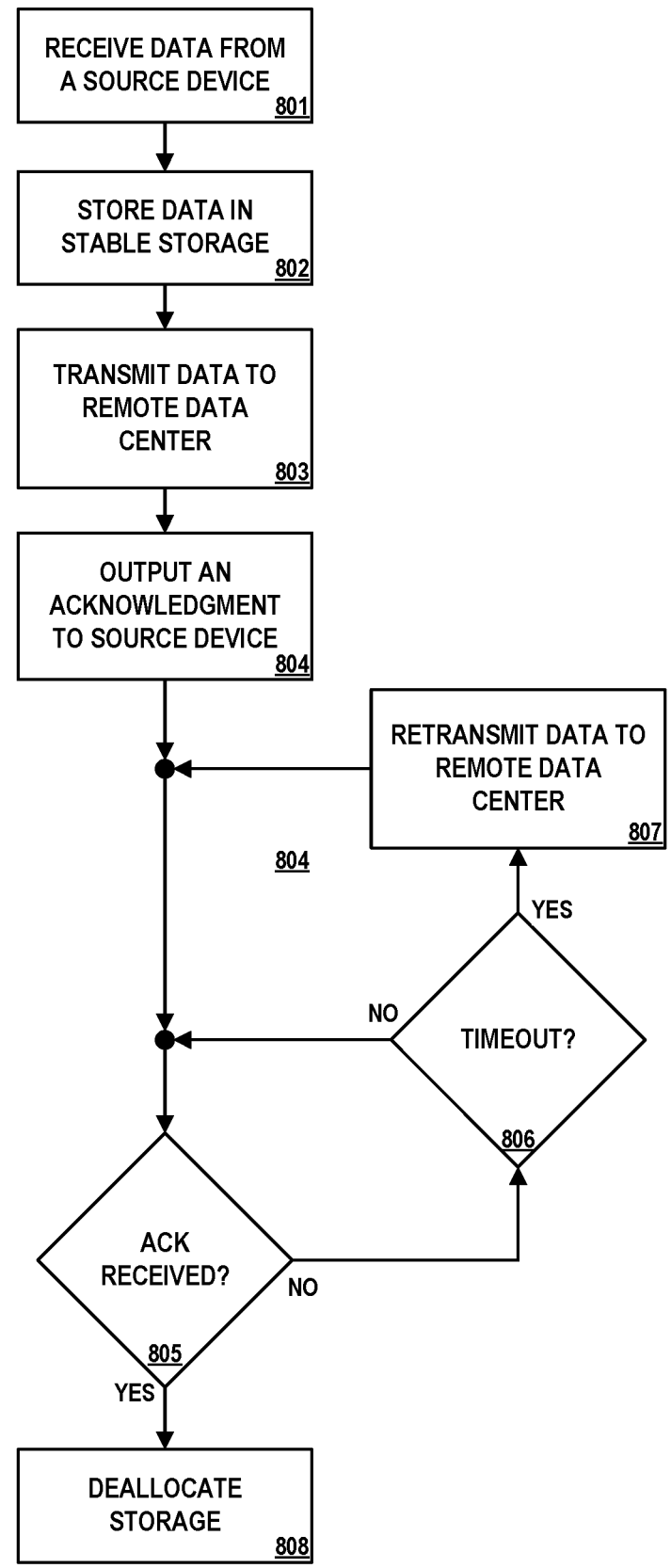
FIG. 8 is a flow diagram illustrating operations performed by an example gateway device, in accordance with one or more aspects of the present disclosure.

More details on access nodes, including their operation and example architectures, are available in U.S. patent application Ser. No. 15/949,892, filed Apr. 10, 2018, entitled "Relay Consistent Memory Management in a Multiple Processor System,", U.S. patent application Ser. No. 16/031,921, filed Jul. 10, 2018, entitled "DATA PROCESSING UNIT FOR COMPUTE NODES AND STORAGE NODES,", and U.S. patent application Ser. No. 16/031,676, filed Jul. 10, 2018, entitled "ACCESS NODE FOR DATA CENTERS,", the entire content of each of which is incorporated herein by reference FIG. 8 is a flow diagram illustrating operations performed by an example gateway device in accordance with one or more aspects of the present disclosure. FIG. 8 is described below within the context of gateway 117A of FIG. 4. In other examples, operations described in FIG. 8 may be performed by one or more other components, modules, systems, or devices. Further, in other examples, operations described in connection with FIG. 8 may be merged, performed in a difference sequence, omitted, or may encompass additional operations not specifically illustrated or described.

In the process illustrated in FIG. 8, and in accordance with one or more aspects of the present disclosure, gateway 117A of FIG. 4 may receive data from a source device (801). For instance, in some examples, and with reference to FIG. 4, server node 12A-1 outputs a signal over link 50 to access node 17A-1. Access node 17A-1 detects a signal and determines that the signal includes data to be stored at server node 12B-1. Access node 17A-1 outputs the data over switch fabric 14A to gateway 117A.

Gateway 117A may store data in stable storage 118A (802). For instance, still referring to FIG. 4, gateway 117A detects a signal over switch fabric 14A and determines that the signal includes data intended for storage at one or more storage devices located outside of data center 101A. Gateway 117A stores the data within high speed memory within gateway 117A. Gateway 117A includes access node 17A', and the high speed memory may be included within memory unit 134 illustrated in FIG. 7. In some examples, gateway 117A may detect an event putting the data is at risk (e.g., a power outage). In response, gateway 117A may also store the data in stable storage 119A, so that hardware or other failures affecting gateway 117A or aspects of data center 101 do not jeopardize the data.

Gateway 117A may transmit data to the remote data center (803). For instance, in some examples, gateway 117A communicates the data over link 106A to gateway 117B. Gateway 117A may include, in the transmitted data, parity bits and/or error-correcting codes to reduce the chances of a bit error occurring during transmission over link 106A. Further, in some examples, gateway 117A may transmit data to multiple gateways 117 within multiple data centers 101 pursuant to a replication and/or data reliability scheme.

Gateway 117A may output an acknowledgment to the source device (804). For instance, after transmitting the data over link 106A to gateway 117B, or at least after placing the last bit of the data on link 106A in FIG. 4, gateway 117A outputs an acknowledgment over switch fabric 14A. Gateway 117A may output such an acknowledgement before the data is stored at the intended storage device located outside of data center 101A. Access node 17A-1 receives a signal over switch fabric 14A and outputs an indication of the signal to server node 12A-1. Server node 12A-1 receives the indication of the signal and determines that the signal corresponds to acknowledgment that the data can be assumed to have been stored successfully at server node 12B-1 within data center 101B.

Gateway 117A may receive an acknowledgment (805). For instance, in some examples, gateway 117A may receive, over link 106A from gateway 117B, an acknowledgement that the data has been successfully transmitted over link 106A. In examples where gateway 117A shards the data (e.g., pursuant to an erasure coding scheme) and transmits the data across multiple data centers 101, gateway 117A may receive an acknowledgement from each of the receiving data centers 101.

Gateway 117A may retransmit the data (807) if an acknowledgement is not received before a timeout of an associated timer (NO branch of 805 and YES branch of 806). For instance, in some examples, gateway 117A might not receive confirmation that the data has been received by each of data centers 101 to which data or a segment of data was transmitted. Gateway 117A may therefore retransmit the data (807) until timely acknowledgment(s) are received (YES branch of 805).

Gateway 117A may deallocate storage after receiving the acknowledgement that the data has been successfully transferred to gateway 117B over link 106A (808). For instance, in some examples, once gateway 117A has received an acknowledgment from gateway 117B, gateway 117B assumes responsibility for storing the data at server node 12B. Gateway 117A therefore typically no longer needs to retain the stored data, so gateway 117A deallocates any storage used for storing the data. In some examples, such as where gateway 117A stores the data within ring buffer 120A, gateway 117A increments a pointer associated with ring buffer 120A, and thereby deallocates space within ring buffer 120A. Ring buffer 120A may then accept additional data for subsequent write operations initiated by one or more server nodes 12A within data center 101A.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of data centers 101 and a limited number of devices or systems (e.g., server nodes 12, access nodes 17, gateways 117, links 106, as well as others) are shown within the Figures and/or in other illustrations referenced herein. However, techniques in accordance with one or more aspects of the present disclosure may be performed with many more of such systems, and collective references to components, devices, modules, and/or systems may represent any number of such components, devices, modules, and/or systems.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A gateway device comprising a storage system and processing circuitry having access to the storage system, wherein the processing circuitry is configured to:
   receive, from a source device within a data center, data to be stored at a remote destination device not located within the data center;
   generate a plurality of data segments that enable the data to be reconstructed from a subset of the plurality of the data segments;
   transmit each of the plurality of data segments by outputting the plurality of data segments over one or more links of a network to a different one of a plurality of remote data centers;
   and
   based at least on outputting each of the plurality of data segments over the one or more links of the network to complete transmission of the data to the remote destination device and before the data is stored at the remote destination device, output, to the source device, a local acknowledgment, wherein the local acknowledgment indicates to the source device that the data can be assumed to have been stored at the remote destination device, and wherein outputting the local acknowledgement after transmitting each of the data segments enables the data to be stored at the remote destination device even if the data center fails.

2. The gateway device of claim 1, wherein the processing circuitry is further configured to:
   receive, responsive to transmitting each of the data segments, a plurality of remote acknowledgements, each of the plurality of remote acknowledgements indicating that a different one of the plurality of data segments has been stored at a respective remote data center.

3. The gateway device of claim 2, wherein the processing circuitry is further configured to:
   store the data to memory included within the gateway device; and
   responsive to receiving the plurality of remote acknowledgements, deallocate the data from the memory included within the gateway device.

4. The gateway device of claim 3, wherein to store the data, the processing circuitry is further configured to:
   store the data to a ring buffer data structure within high-speed memory included within the gateway device.

5. The gateway device of claim 1, wherein the processing circuitry is further configured to:
   detect a failure within the data center;
   responsive to detecting the failure, store the data in stable storage accessible to the gateway device;
   after storing the data in the stable storage, determine that the data center is operational; and
   access the data stored in the stable storage.

6. The gateway device of claim 1, wherein to generate the plurality of data segments, the processing circuitry is further configured to:
   split the data into data segments, including a first data segment and a second data segment; and
   generate an erasure coding parity segment.

7. The gateway device of claim 6, wherein the plurality of remote data centers include a first remote data center, a second remote data center, and a third remote data center, and wherein to transmit each of the plurality of data segments, the processing circuitry is further configured to:
   transmit the first data segment to the first remote data center;
   transmit the second data segment to the second remote data center; and
   transmit the erasure coding parity segment to the third remote data center.

8. The gateway device of claim 7, wherein the processing circuitry is further configured to:
   detect, prior to the data being stored at the remote destination device, failure of the first remote data center;
   responsive to detecting the failure of the first remote data center, access the second data segment from the second remote data center, and access the parity segment from the third remote data center;
   reconstruct the data using the second data segment and the parity segment; and
   enable storage of the data at the remote destination device.

9. A method comprising:
   receiving, by a gateway device and from a source device within a data center, data to be stored at a remote destination device not located within the data center;
   generating a plurality of data segments that enable the data to be reconstructed from a subset of the plurality of the data segments;
   transmitting, by the gateway device, each of the plurality of data segments by outputting the plurality of data segments over one or more links of a network to a different one of a plurality of remote data centers; and
   based at least on outputting each of the plurality of data segments over the one or more links of the network to complete transmission of the data to the remote destination device and before the data is stored at the remote destination device, outputting, by the gateway device and to the source device, a local acknowledgment, wherein the local acknowledgment indicates to the source device that the data can be assumed to have been stored at the remote destination device, and wherein outputting the local acknowledgement after transmitting each of the data segments enables the data to be stored at the remote destination device even if the data center fails.

10. The method of claim 9, further comprising:
    receiving, by the gateway device and responsive to transmitting each of the data segments, a plurality of remote acknowledgements, each of the plurality of remote acknowledgements corresponding to a different one of the plurality of data segments being stored at a respective remote data center.

11. The method of claim 10, further comprising:
    storing, by the gateway device, the data to memory included within the gateway device; and
    responsive to receiving the plurality of remote acknowledgements, deallocating the data from the memory included within the gateway device.

12. The method of claim 11, wherein storing the data includes:
    storing the data to a ring buffer data structure within high-speed memory included within the gateway device.

13. The method of claim 9, further comprising:
    detecting, by the gateway device, a failure within the data center;
    responsive to detecting the failure, storing, by the gateway device, the data in stable storage accessible to the gateway device;
    after storing the data in the stable storage, determining, by the gateway device, that the data center is operational; and
    accessing, by the gateway device, the data stored in the stable storage.

14. The method of claim 9, wherein generating the plurality of data segments includes:
    splitting the data into data segments, including a first data segment and a second data segment; and
    generating an erasure coding parity segment.

15. The method of claim 14, wherein the plurality of remote data centers include a first remote data center, a second remote data center, and a third remote data center, and wherein transmitting each of the plurality of data segments includes:
    transmitting the first data segment to the first remote data center;
    transmitting the second data segment to the second remote data center; and
    transmitting the erasure coding parity segment to the third remote data center.

16. The method of claim 15, further comprising:
    detecting, prior to the data being stored at the remote destination device, failure of the first remote data center;
    responsive to detecting the failure of the first remote data center, accessing the second data segment from the second remote data center, and accessing the parity segment from the third remote data center;
    reconstructing the data using the second data segment and the parity segment; and
    enabling storage of the data at the remote destination device.

17. A storage device for storing computer-readable instructions that, when executed, configure processing circuitry to:

receive, from a source device within a data center, data to be stored at a remote destination device not located within the data center;

generate a plurality of data segments that enable the data to be reconstructed from a subset of the plurality of the data segments;

transmit each of the plurality of data segments by outputting the plurality of data segments over one or more links of a network to a different one of a plurality of remote data centers; and based at least on outputting each of the plurality of data segments over the one or more links of the network to complete transmission of the data to the remote destination device and before the data is stored at the remote destination device, output, to the source device, a local acknowledgment, wherein the local acknowledgment indicates to the source device that the data can be assumed to have been stored at the remote destination device, and wherein outputting the local acknowledgement after transmitting each of the data segments enables the data to be stored at the remote destination device even if the data center fails.

18. The storage device of claim 17, wherein the processing circuitry is further configured to:

receive, responsive to transmitting each of the data segments, a plurality of remote acknowledgements, each of the plurality of remote acknowledgements indicating that a different one of the plurality of data segments has been stored at a respective remote data center.

19. The storage device of claim 18, wherein the processing circuitry is further configured to:

store the data to memory included within a gateway device; and responsive to receiving the plurality of remote acknowledgements, deallocate the data from the memory included within the gateway device.

20. The storage device of claim 19, wherein to store the data, the processing circuitry is further configured to:

store the data to a ring buffer data structure within high-speed memory included within the gateway device.

* * * * *